United States Patent [19]

Fukuoka et al.

[11] Patent Number: 5,723,173
[45] Date of Patent: Mar. 3, 1998

[54] METHOD FOR MANUFACTURING SOLID POLYMER ELECTROLYTE FUEL CELL

[75] Inventors: Yuko Fukuoka, Kyoto; Makoto Uchida; Nobuo Eda, both of Hirakata, all of Japan

[73] Assignee: Matsushita Electric Industrial Co., Ltd., Osaka, Japan

[21] Appl. No.: 590,118

[22] Filed: Jan. 23, 1996

[30] Foreign Application Priority Data

Jan. 26, 1995 [JP] Japan ................................ 7-010579
Jan. 26, 1995 [JP] Japan ................................ 7-010580
Jan. 10, 1996 [JP] Japan ................................ 8-001981

[51] Int. Cl.$^6$ ........................................ B05D 5/12
[52] U.S. Cl. .................. 427/115; 29/623.5; 429/30; 429/33; 429/34; 429/42
[58] Field of Search ................... 29/623.5; 427/115; 429/30, 33, 34, 42

[56] References Cited

U.S. PATENT DOCUMENTS

| | | | |
|---|---|---|---|
| 4,876,115 | 10/1989 | Raistrick | 427/115 |
| 5,211,984 | 5/1993 | Wilson | 427/115 |
| 5,474,857 | 12/1995 | Uchida et al. | 429/34 X |

FOREIGN PATENT DOCUMENTS

| | | |
|---|---|---|
| 0228602 | 7/1987 | European Pat. Off. |
| 0483085 | 4/1992 | European Pat. Off. |
| 0577291 | 1/1994 | European Pat. Off. |
| 0637851 | 2/1995 | European Pat. Off. |
| 4447132 | 7/1995 | Germany |
| 62-61118B2 | 12/1986 | Japan |
| 62-61119B2 | 12/1986 | Japan |
| 2-48632B2 | 3/1989 | Japan |
| 3-184266A | 8/1991 | Japan |
| 3-295172A | 12/1991 | Japan |
| 4-264367A | 9/1992 | Japan |
| 5-36418A | 2/1993 | Japan |
| 92/15121 | 9/1992 | WIPO |

OTHER PUBLICATIONS

Masahiro Watanabe, et al; New Preparation Method of a High Performance Gas Diffusion Electrode Working at 100% Utilization of Catalyst Clusters and Analysis of the Reaction Layer; J. Electroanal. Chem., 197 (1986), pp. 195–208.

*Primary Examiner*—Michael Lusignan
*Attorney, Agent, or Firm*—Watson Cole Stevens Davis, P.L.L.C.

[57] ABSTRACT

The invention provides a method for manufacturing a solid polymer electrolyte electrolyte fuel cell which exhibits higher performances by sufficiently and uniformly contacting the solid polymer electrolyte with a catalyst to increase the reaction area inside the electrode. The method comprises the steps of dispersing a carbon powder supporting a noble metal catalyst in an organic solvent to obtain a dispersion, mixing the resulting dispersion with an alcoholic solution of a solid polymer electrolyte to produce a colloid of the solid polymer electrolyte and simultaneously to obtain a mixed solution in which said colloid is adsorbed to the carbon powder, applying the mixed solution on one side of a gas-diffusion layer to produce an electrode, and pressing the resulting electrode on at least one side of a solid polymer electrolyte membrane to integrate them. Furthermore, a fluorocarbon polymer can be added, to thereby form a gas channel without excessive covering of the catalyst and increase gas permeability of the electrode. Thus, a solid polymer electrolyte fuel cell which exhibits high performances in a high current density area can be further provided.

37 Claims, 15 Drawing Sheets

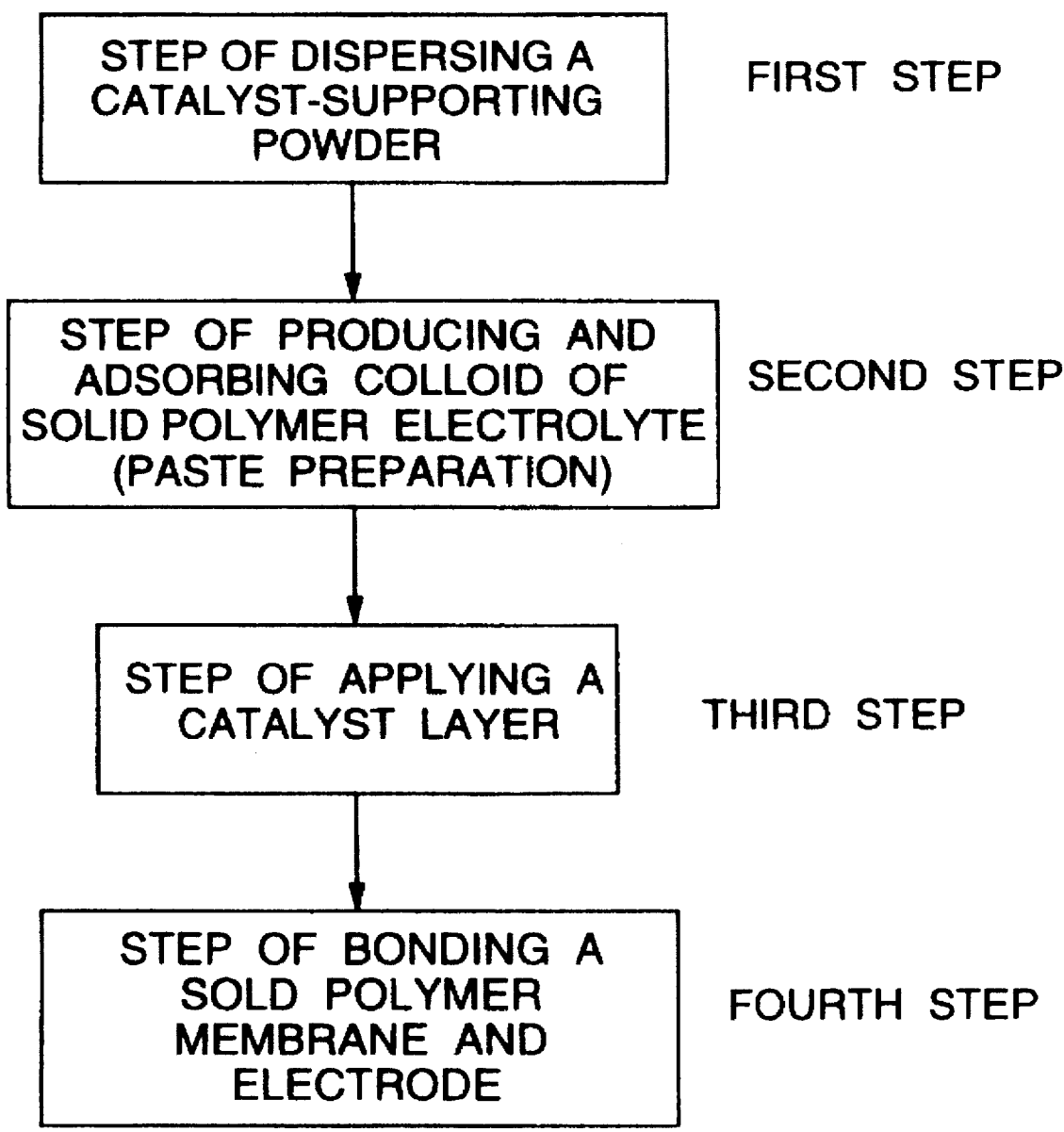

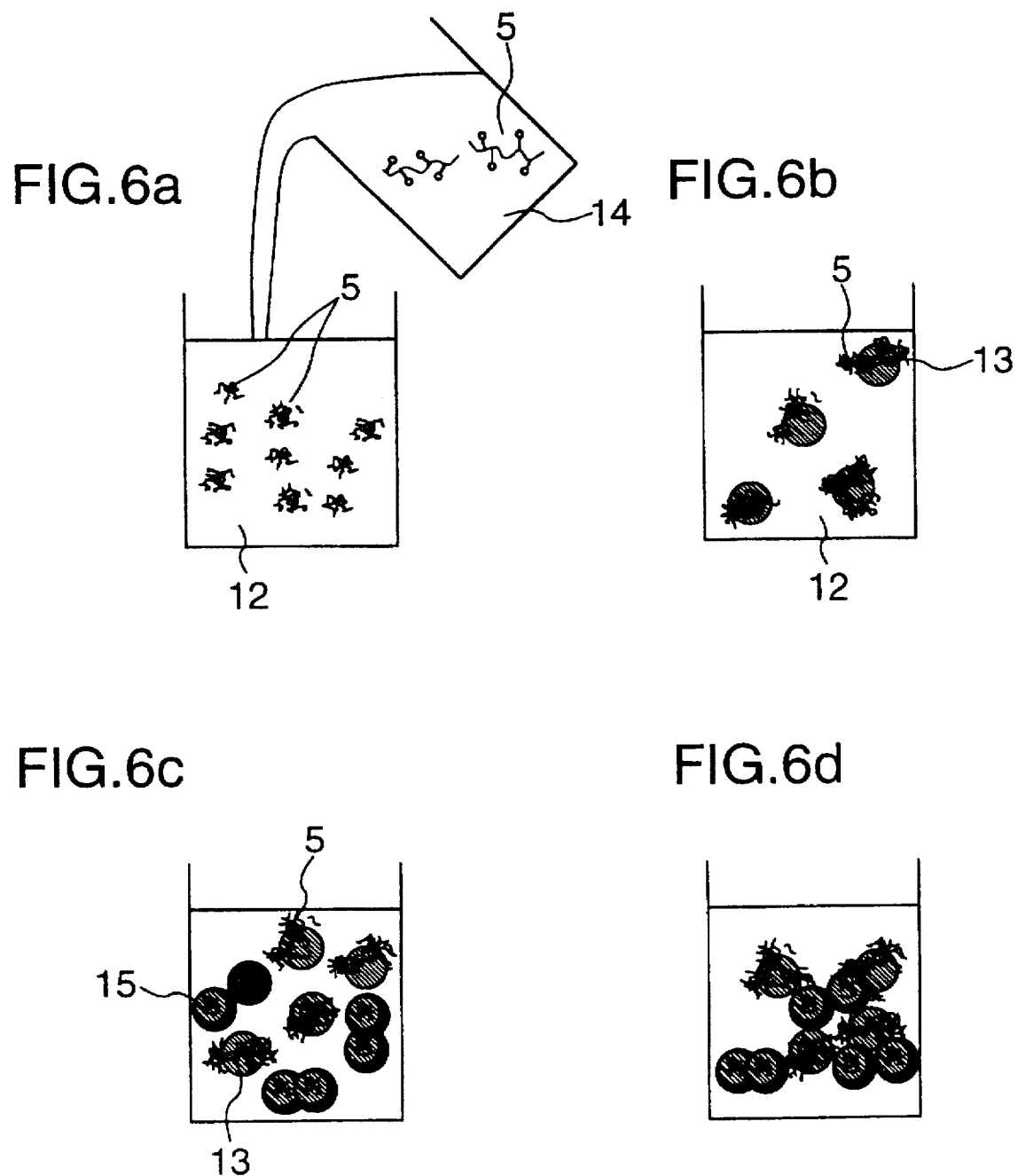

METHOD 1

METHOD 2

METHOD FOR MANUFACTURING SOLID POLYMER ELECTROLYTE FUEL CELL

BACKGROUND OF THE INVENTION

1. Field of the Invention

The present invention relates to a fuel cell which uses as a fuel a reducing agent such as pure hydrogen or a modified hydrogen obtained from methanol or fossil fuels and as an oxidizing agent air or oxygen, and more particularly to a fuel cell which uses a solid polymer as an electrolyte.

2. Description of Prior Art

One of the most important factors which govern the discharge performance of solid polymer electrolyte fuel cells is the reaction surface area at an interface of a three phase zone by pores which are passages for feeding of reaction gases, a solid polymer electrolyte having protonic conductivity due to contained water and an electrode material as electronic conductor at the interface between a solid polymer electrolyte membrane and an electrode.

Hitherto, in order to increase the three phase zone, it has been attempted to apply a layer prepared by mixing and dispersing an electrode material and a solid polymer electrolyte to the interface between the membrane and a porous electrode. For example, JP 62-61118 (B) and 62-61119 (B) disclose a method which comprises coating a mixture of a solution of solid polymer electrolyte with a catalyst compound on a solid polymer membrane, hot pressing the coated membrane on an electrode material and then reducing the catalyst compound or carrying out the coating after the reduction and then carrying out the hot pressing.

JP 2-48632 (B) employs a method which comprises molding a porous electrode, sprinkling a solution of a solid polymer electrolyte on the electrode and hot pressing the electrode to the solid polymer electrolyte. Furthermore, JP 3-184266 (A) uses a powder prepared by coating a solid polymer electrolyte on the surface of a resin. JP 3-295172 (A) employs a method which comprises incorporating a powder of a solid polymer electrolyte into an electrode. JP 5-36418 (A) discloses a method which comprises mixing a solid polymer electrolyte, a catalyst, a carbon powder and a fluoropolymer and forming the mixture into a film to form an electrode.

All of the above patent publications use alcohols as a solvent for dissolving the solid polymer electrolyte. Furthermore, U.S. Pat. No. 5,211,984 reports a method which comprises preparing an inky dispersion comprising a solid polymer electrolyte, a catalyst and a carbon powder using glycerol or a tetrabutylammonium salt as a solvent, casting the dispersion on a polytetrafluoroethylene (hereinafter referred to as "PTFE"), and then transferring it onto the surface of a solid polymer electrolyte membrane or a method which comprises changing the exchange group of a solid polymer electrolyte membrane to that of a Na type, applying the above inky dispersion on the surface of the membrane and heating and drying the coat at 125° C. or higher to again change the group to that of a Na type.

In order to realize the high power density which is a feature of solid polymer electrolyte fuel cells, it is important to form a feeding channel for reaction gas (gas channel) in the catalyst layer to enhance the gas permeation and diffusion. Therefore, it has been attempted to add a water repellent material such as a fluorocarbon polymer and to form a gas channel in the layer.

For example, in JP 5-36418, a PTFE powder and a carbon powder supporting a catalyst are dispersed in a solution of a solid polymer electrolyte and kneaded to form a catalyst layer. Furthermore, in JP 4-264367, an electrode is prepared using a mixed solution of a carbon powder supporting a catalyst with a colloid solution of PTFE.

Furthermore, J. Electroanal. Chem. 197 (1986) describes on page 195 that a carbon powder subjected to water repelling treatment with PTFE is mixed with a carbon powder supporting a catalyst and a gas-diffusion electrode for acidic electrolyte is prepared therefrom. In U.S. Pat. No. 5,211,984, a catalyst layer of electrode is prepared using only a solid polymer electrolyte, a catalyst and a carbon powder without using the water repellent material mentioned above.

However, when a carbon powder supporting a catalyst and a water repellent material such as fluorocarbon polymer or a carbon powder treated for water repellence are simultaneously added to a solution of solid polymer electrolyte, much solid polymer electrolyte is adsorbed to the water repellent material or the carbon powder treated for water repellence, which causes insufficient degree of contact between the solid polymer electrolyte and the catalyst and, as a result, no sufficient reaction area can be ensured at the interface between the electrode and the solid polymer electrolyte.

Furthermore, when a dispersion prepared using an alcoholic solvent is applied on a porous substrate or when an inky dispersion is applied on a porous substrate, the dispersion cannot be directly molded on the surface of the substrate as the dispersion penetrates or permeates into the inside of the substrate and, thus, complicated processing techniques such as transferring are needed.

Moreover, the above-mentioned method of directly applying the inky dispersion on the surface of the membrane requires the complicated production technique of replacing the exchange group of the membrane many times.

The method of adding a fluorocarbon polymer has the defect that the catalyst particles are covered excessively with the fluorocarbon polymer and the reaction area diminishes to cause deterioration of polarization characteristics. On the other hand, if the carbon powder treated for water repellence with PTFE is used as described in J. Electroanal. Chem., covering of the catalyst particles with PTFE can be controlled, but no investigation has been made on the effects of addition of the water repelled carbon powder or amount of the carbon powder added in case the solid polymer electrolyte is used. Further, when the electrode is made of only the catalyst-supporting carbon powder and the solid polymer electrolyte, there are problems that the cell voltage at a high current density decreases or becomes unstable due to flooding of water produced.

SUMMARY OF THE INVENTION

An object of the present invention is to provide a method for manufacturing a solid polymer electrolyte fuel cell in which the reaction area inside the electrode is increased by allowing the solid polymer electrolyte to sufficiently and uniformly contact with a catalyst, to thereby give the higher performances to the cell.

Another object of the present invention is to provide a method for manufacturing a solid polymer electrolyte fuel cell in which a gas channel is formed without excessive covering of the catalyst with addition of a fluorocarbon polymer to enhance the gas permeability of the electrode and to give the higher performance in the area of a high current density.

BRIEF DESCRIPTION OF THE DRAWINGS

FIG. 3 is a block diagram which shows the steps of manufacture of the solid polymer electrolyte fuel cell in the example of the present invention.

FIG. 6a shows the step of forming the colloid in the present invention.

FIG. 6b shows the step of adding the catalyst-supporting carbon powder and adsorbing the colloid.

FIG. 6c shows the step of adding the carbon powder treated for water repellence.

FIG. 6d shows the state of bridging agglomeration in the present invention.

DETAILED DESCRIPTION OF PREFERRED EMBODIMENTS

The present method comprises the steps of dispersing a carbon powder supporting a noble metal catalyst in an organic solvent to obtain a dispersion, mixing the dispersion with an alcoholic solution of a solid polymer electrolyte to produce a colloid of the solid polymer electrolyte and simultaneously to obtain a mixed solution comprising the carbon powder to which the colloid is adsorbed, applying the mixed solution on one side of a gas-diffusion layer to produce an electrode, and pressing the resulting electrode onto at least one side of a solid polymer electrolyte membrane to integrate them.

Another method comprises the steps of mixing an organic solvent with an alcoholic solution of a solid polymer electrolyte to produce a colloid of the solid polymer electrolyte and to obtain a colloidal dispersion in which the colloid is dispersed, adding a carbon powder supporting a noble metal catalyst to the said colloidal dispersion to obtain a mixed solution comprising the carbon powder to which the colloid of the solid polymer electrolyte is adsorbed, adding to the mixed solution a carbon powder treated for water repellence with fluorocarbon polymer, applying the mixed solution on one side of a gas-diffusion layer to produce an electrode, and pressing the resulting electrode onto at least one side of a solid polymer electrolyte membrane to integrate them.

The present invention is a method which comprises the steps of dispersing a carbon powder supporting a noble metal catalyst in an organic solvent to obtain a dispersion, mixing the dispersion with an alcoholic solution of a solid polymer electrolyte to produce a colloid of the solid polymer electrolyte and simultaneously to obtain a mixed solution comprising the carbon powder to which the colloid is adsorbed, applying the mixed solution on one side of a gas-diffusion layer to produce an electrode, and pressing the resulting electrode onto at least one side of a solid polymer electrolyte membrane to integrate them.

Figure 1:
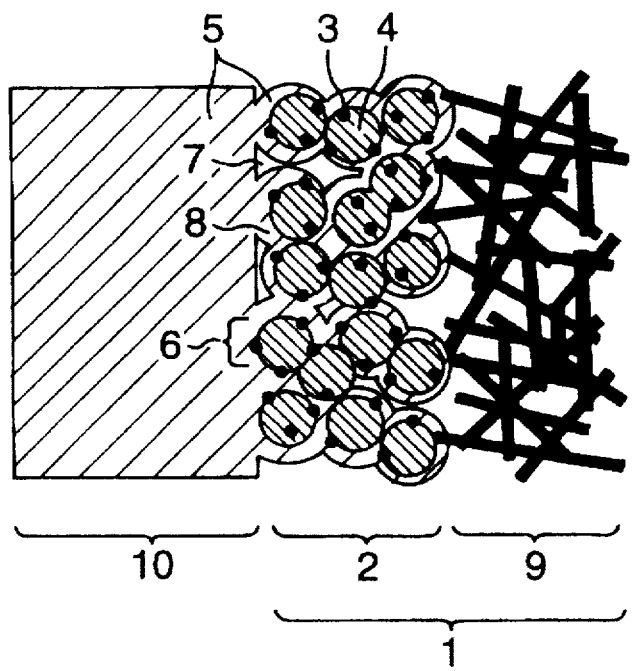
FIG. 1 is a schematic cross-sectional view of the electrode in the example of the present invention.

According to the above method, since a carbon powder supporting a noble metal catalyst is previously dispersed in an organic solvent and, then, a colloid of a solid polymer electrolyte is uniformly adsorbed onto the carbon powder, it becomes possible to keep catalyst fine particles 3, carbon powder 4 and solid polymer electrolyte 5 in uniformly adhering state inside catalyst layer 2 of electrode 1 as can be seen from the schematic cross-sectional view shown in FIG. 1.

According to such construction of the catalyst layer 2, the three channels of gas channel 7 formed by the pores between the carbon powders 4 which is a passage for feeding a fuel gas such as hydrogen or an oxidizing agent gas such as oxygen, proton channel 8 formed by the hydrated solid polymer electrolyte 5, and electron channel 6 formed by mutual connection of the carbon powders can be efficiently formed in the state of being close to each other inside the same catalyst layer. In FIG. 1, 9 indicates a gas-diffusion layer and 10 indicates a solid polymer electrolyte membrane.

Accordingly, feed of hydrogen and oxygen gas and transfer of proton and electron can be carried out simultaneously and smoothly in a wide range by the following reaction at the hydrogen electrode:

$$H_2 \rightarrow 2H^+ + 2e^-$$

and the following reaction at the oxygen electrode:

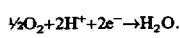

$$\tfrac{1}{2}O_2 + 2H^+ + 2e^- \rightarrow H_2O.$$

Therefore, the reaction rate and the reaction area are increased and it becomes possible to realize a solid polymer electrolyte fuel cell which exhibits a higher discharge performance.

Figure 2:
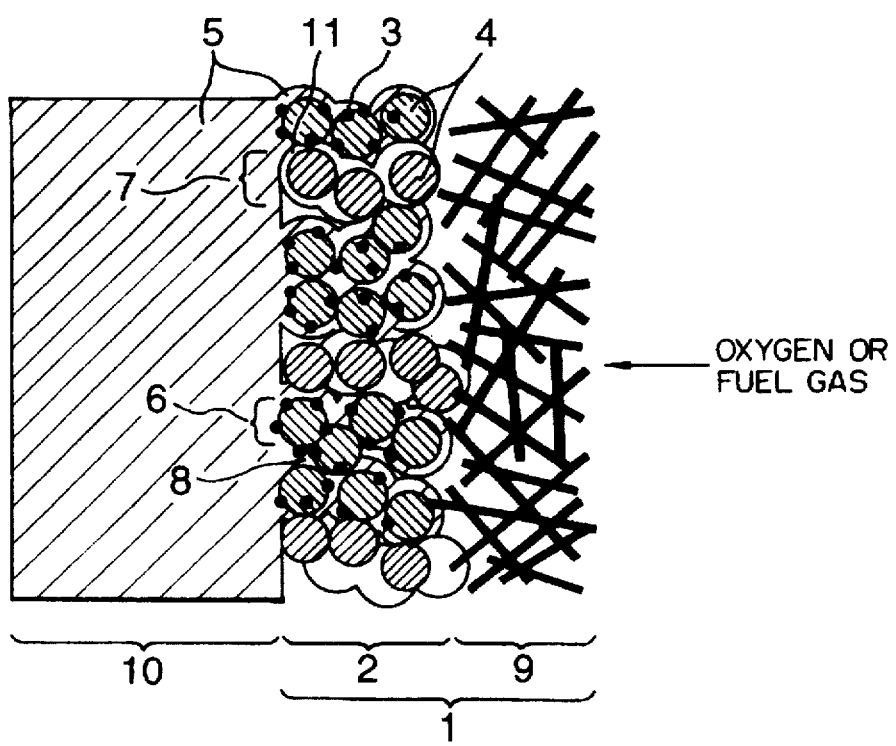
FIG. 2 is a schematic cross-sectional view of the electrode in another example of the present invention.

Furthermore, as shown in FIG. 2, by further adding a carbon powder treated for water repellence with fluorocarbon polymer 11 to the catalyst layer 2, the gas channel 7 can be formed without excessive covering with the catalyst particles 3 and, thus, it becomes possible to realize a solid polymer electrolyte fuel cell which shows the higher polarization characteristic in the area of high current density.

Furthermore, by adding dropwise an alcoholic solution of a solid polymer electrolyte, the solid polymer electrolyte which covers the noble metal catalyst becomes a thin layer and, as a result, diffusion and permeation of the reaction gas occur readily.

Moreover, another method of the present invention comprises the steps of mixing an organic solvent with an alcoholic solution of a solid polymer electrolyte to produce a colloid of the solid polymer electrolyte and to obtain a colloidal dispersion in which the colloid is dispersed, adding a carbon powder supporting a noble metal catalyst to the said colloidal dispersion to obtain a mixed solution comprising the carbon powder to which the colloid of the solid polymer electrolyte is adsorbed, adding to the mixed solution a carbon powder treated for water repellence with fluorocarbon polymer, applying the mixed solution on one side of a gas-diffusion layer to produce an electrode, and pressing the resulting electrode onto at least one side of a solid polymer electrolyte membrane to integrate them.

According to the above method, first a carbon powder supporting a noble metal catalyst is added to a dispersion prepared by dispersing a colloid of a solid polymer electrolyte in an organic solvent to concentrically adsorb the colloid of the solid polymer electrolyte to the surface of the carbon powder, and, thereafter, a carbon powder treated for water repellence is added. Therefore, the carbon powder supporting the noble metal catalyst and the solid polymer electrolyte can be sufficiently and uniformly contacted with each other, and as shown in FIG. 2, it becomes possible to disperse catalyst fine particles 3, carbon powder 4 and solid polymer electrolyte 5 in uniformly and sufficiently adhering state inside catalyst layer 2 of electrode 1.

According to such construction of the catalyst layer 2, the three channels of gas channel 7 formed by the pores between the carbon powders 4 which is a passage for feeding a fuel gas such as hydrogen or an oxidizing agent gas such as oxygen, proton channel 8 formed by the hydrated solid polymer electrolyte 5, and electron channel 6 formed by mutual connection of the carbon powders can be efficiently formed in the state being close to each other inside the same catalyst layer. In FIG. 2, 10 indicates a solid polymer electrolyte membrane. Moreover, by adding a carbon powder treated for water repellence with fluorocarbon polymer 11 to the catalyst layer 2, the gas channel 7 can be formed without excessive covering with the catalyst particles 3 and, thus, it becomes possible to realize a solid polymer electrolyte fuel cell which shows the higher polarization performances in the area of high current density.

The embodiments of the present invention will be illustrated with reference to FIG. 3–FIG. 6.

[Embodiment 1]

All production steps of one example of the present invention are shown in FIG. 3. A detail of the first step and the second step are shown in FIG. 4a–FIG. 4d. The method of the present invention will be explained using them.

Figure 4A:
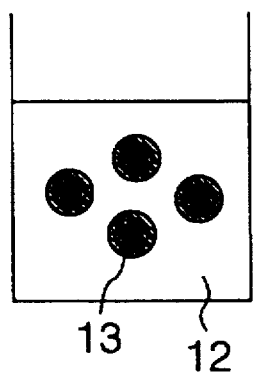
FIG. 4a shows the state of the dispersion of the catalyst-supporting carbon powder of the present invention.
Figure 4B:
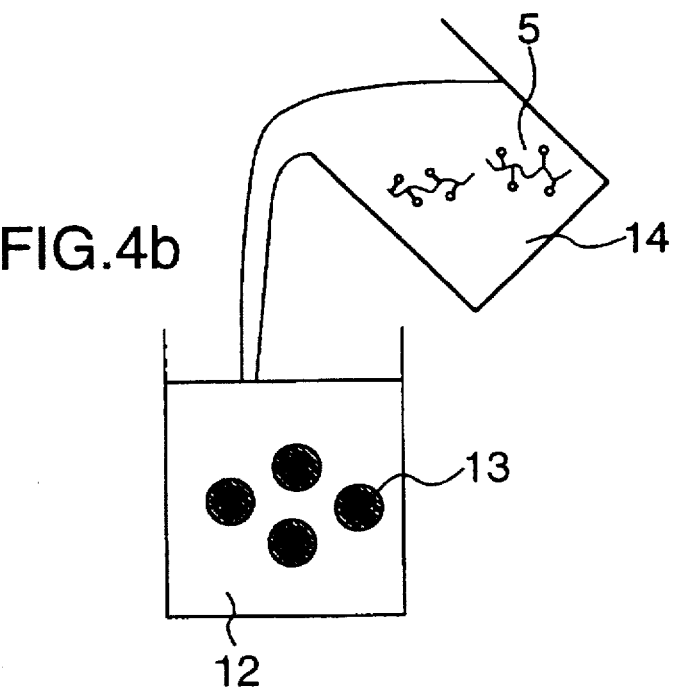
FIG. 4b shows the state of mixing with the solid polymer electrolyte of the present invention.
Figure 4C:
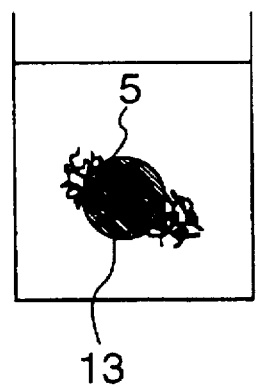
FIG. 4c shows the state of the solid polymer electrolyte being adsorbed onto a catalyst-supporting carbon powder.
Figure 4D:
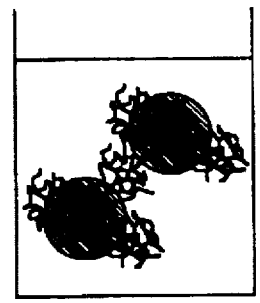
FIG. 4d shows the state of bridging agglomeration in the present invention.

In the first step, carbon powder 13 supporting a catalyst is dispersed in organic solvent 12 as shown in FIG. 4a. In the second step, alcoholic solution 14 containing solid polymer electrolyte 5 is mixed with the resulting dispersion as shown in FIG. 4b, and a colloid of the solid electrolyte 5 shown in FIG. 4c is produced. This colloidal solid polymer electrolyte 5 is adsorbed onto the surface of the carbon powder 13 supporting a catalyst. The size of agglomeration of the solid polymer electrolyte 5 varies depending on the amount of the organic solvent 12, the difference of molecular chain of the organic solvent and the amount of the alcoholic solution 14, and, thus, the uniformity of adsorption can be controlled. When the catalyst-supporting carbon powder 13 having the solid polymer electrolyte adsorbed thereto are allowed to collide with each other by ultrasonic dispersion or the like, the solid polymer electrolyte adsorbed to the carbon powder is also adsorbed to other carbon powder 4 to produce a bridging agglomeration as shown in FIG. 4d to make the dispersion pasty.

In the third step subsequent to the first step and the second step, the paste is applied on gas-diffusion layer 9 and molded as shown in FIG. 3. The catalyst-supporting carbon powder 13 is prevented from penetrating into the inside of the gas-diffusion layer 9 by the bridging agglomeration formed in the second step, and only the organic solvent 12 and alcoholic solution 14 are filtrated and separated to make it possible to form catalyst layer 2 on the surface of the gas-diffusion layer 9. In the fourth step, a cell is produced by hot pressing the electrode 1 onto the solid polymer electrolyte membrane 10. FIG. 2 shows a schematic cross-sectional view of the electrode.

[Embodiment 2]

Figure 5:
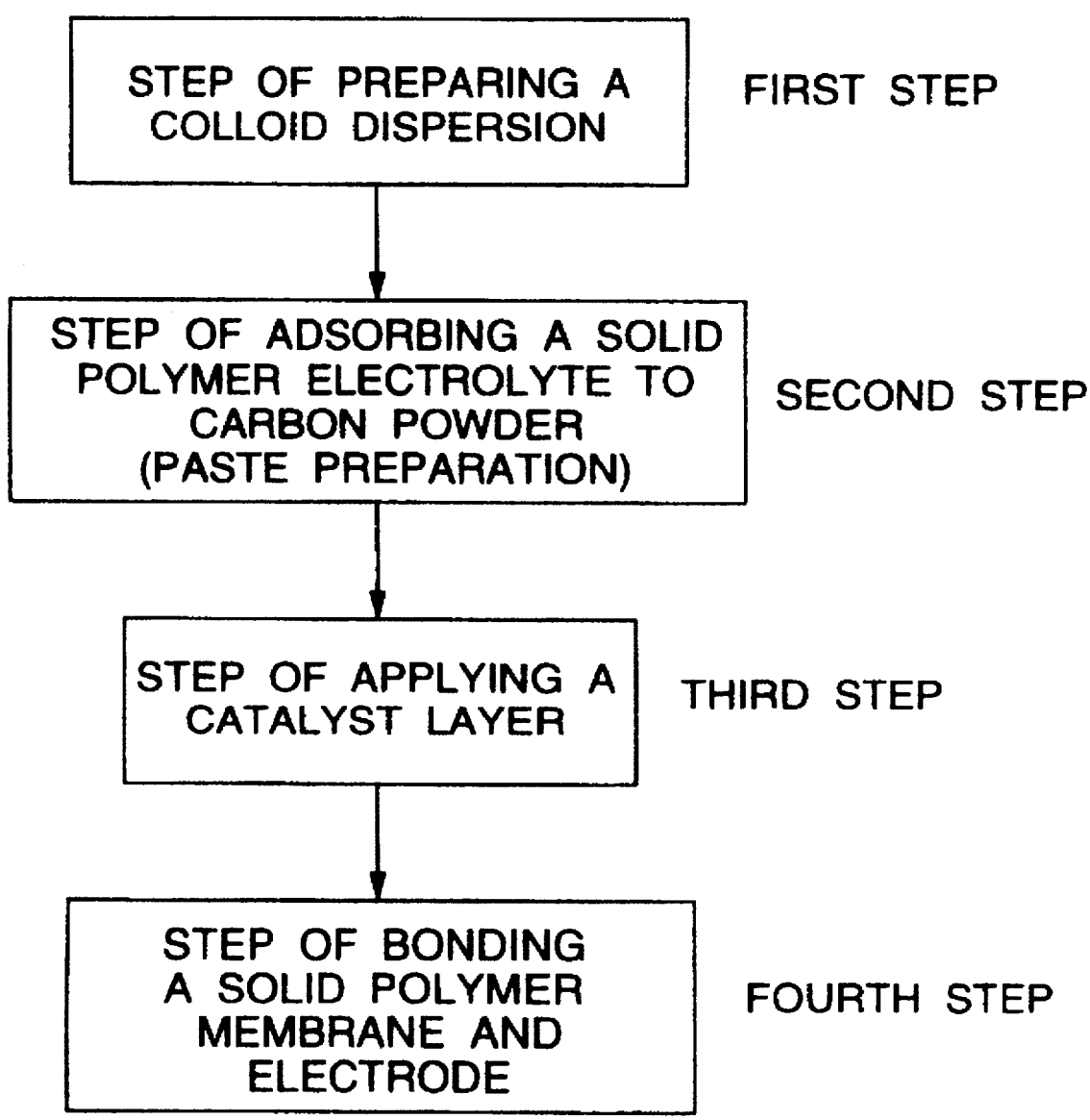
FIG. 5 is a block diagram which shows the steps of manufacture of the solid polymer electrolyte fuel cell in another example of the present invention.

All production steps of one example of the present invention are shown in FIG. 5. Details of the first step and the second step are shown in FIG. 6a–FIG. 6d. The method of the present invention will be explained using them.

First, in the first step, alcoholic solution 14 containing solid polymer electrolyte 5 and organic solvent 12 are mixed and stirred to produce a colloidal dispersion of solid polymer electrolyte 5 as shown in FIG. 6a. In the second step shown in FIG. 6b, when a catalyst-supporting carbon powder 13 is added to the colloidal dispersion, the solid polymer electrolyte 5 is adsorbed onto the surface of the catalyst-supporting carbon powder 13. The size of agglomeration of the solid polymer electrolyte 5 varies depending on the amount of the organic solvent and the difference of molecular chain of the organic solvent, and the uniformity of adsorption can be controlled. Then, 25 g of carbon powder 15 treated for water repellence with addition of 25–70% by weight of PTFE is added as shown in FIG. 6c. When the catalyst-supporting carbon powders 13 having the solid polymer electrolyte 5 adsorbed thereto and the carbon powder 15 are allowed to collide with each other by ultrasonic dispersion or the like, the solid polymer electrolyte adsorbed to the catalyst-supporting carbon powder is also adsorbed to other carbon powder 4 to form a bridging agglomeration as shown in FIG. 6d to make the dispersion pasty.

In the third step subsequent to the first step and the second step as shown in FIG. 5, the paste is applied on gas-diffusion layer 9 and molded. The catalyst-supporting carbon powder 13 is prevented from penetrating into the inside of the gas-diffusion layer 9 due to the bridging agglomeration formed in the second step, and only the solvent is filtrated and separated to make it possible to form the catalyst layer 2 on the surface of gas-diffusion layer 9. In the fourth step, a cell is produced by hot pressing the electrode 1 onto the solid polymer electrolyte membrane 10. FIG. 2 shows a schematic cross-sectional view of the electrode.

Examples of the present invention will be illustrated referring to the accompanying drawings.

Example 1

In the first step of the Embodiment 1, n-butyl acetate $(CH_3COOCH_2(CH_2)_2CH_3)$ was used as the organic solvent of esters, and in this organic solvent was dispersed 50 g of carbon powder on which 10–25% by weight of a platinum catalyst was supported.

In the second step, "5% Nafion solution" manufactured by Aldrich Chemical Co., Inc. was used as the solid polymer electrolyte. A white colloid was produced by mixing 60 g of n-butyl acetate with 1 g of the Nafion polymer. The colloidal solid polymer electrolyte was immediately adsorbed to the surface of the catalyst-supporting carbon powder and when stirring was stopped for a while after completion of addition of all the solid polymer electrolyte, the supernatant liquid became transparent. When the carbon powders to which the solid polymer electrolyte was adsorbed were allowed to collide with each other by an ultrasonic dispersing machine, the adsorbed polymer was also adsorbed to other carbon powders to produce a bridging agglomeration and the dispersion became pasty.

In the third step, the resulting paste was applied on a carbon paper substrate to which 20–60% by weight of a fluorocarbon polymer was added (manufactured by Toray Industries, Inc.). The bridging agglomeration which was formed in the second step prevented the carbon powder-supporting catalyst from penetrating into the carbon paper and only the solvent was removed and filtrated, whereby it became possible to mold the catalyst layer on the surface of the substrate.

In the fourth step, the above electrodes were hot pressed on both sides of Nafion membrane manufactured by DuPont de Nemours, E., I., Co. by application of a pressure of 5–100 kg/cm$^2$ at 120°–200° C. to make a cell A.

In this Example 1, n-butyl acetate was used as the ester organic solvent. The dispersing state of the colloid changed depending on the difference in the carbon chains of the solvent and when the dispersion of the solid polymer electrolyte was added to an ester solvent in which the carbon chain bonding to a polar group had 8 or more carbon atoms, such as 2-ethylhexyl acrylate, the solid polymer electrolyte produced a white precipitate. When the precipitate was formed, the uniformity of adsorption to the carbon powder in the second step was deteriorated. Therefore, dispersing state of the solid polymer electrolyte was poor and the polarization characteristics of the cell could hardly be taken out.

Example 2

Cell B was produced in the same manner as in Example 1, except that tetrahydrofuran ($C_4H_8O$) was used as an ether organic solvent in the first step.

In this Example 2, tetrahydrofuran was used as the ether organic solvent. The dispersing state of the colloidal dispersion changed depending on the difference in the carbon chain of the solvent and when the dispersion of the solid polymer electrolyte was added to an ether solvent in which the carbon chain bonding to a polar group had 2 or less carbon atoms, such as diethyl ether, the colloid was not produced.

Furthermore, when the dispersion of the solid polymer electrolyte was added to an ether solvent in which the carbon chain bonding to a polar group had 6 or more carbon atoms, such as dihexyl ether, the solid polymer electrolyte produced a white precipitate and the polarization characteristics of the cell could hardly be taken out.

Example 3

Cell C was produced in the same manner as in Example 1, except that methyl amyl ketone ($CH_3CO(CH_2)_4CH_3$) was used as a ketone organic solvent in the first step.

In this Example 3, methyl amyl ketone was used as the ketone organic solvent. The dispersing state of the colloid changed depending on the difference in the carbon chain of the solvent and when the dispersion of the solid polymer electrolyte was added to a ketone solvent in which the carbon chain bonding to a polar group had 3 or less carbon atoms, such as methyl ethyl ketone or methyl propyl ketone, the colloidal dispersion was not produced.

Furthermore, when the dispersion of the solid polymer electrolyte was added to a ketone solvent in which the carbon chain bonding to a polar group had 9 or more carbon atoms, such as methyl-n-nonyl ketone, the solid polymer electrolyte produced a white precipitate and the polarization characteristics of the cell could hardly be taken out.

Example 4

Cell D was produced in the same manner as in Example 1, except that n-butylamine ($CH_3(CH_2)_3NH_2$) was used as an amine organic solvent in the first step.

In this Example 4, n-butylamine was used as the amine organic solvent, but the dispersing state of the colloid changed depending on the difference in the carbon chain of the solvent and when the dispersion of the solid polymer electrolyte was added to an amine solvent in which the carbon chain bonding to a polar group had 6 or more carbon atoms, such as cyclohexylamine, the solid polymer electrolyte produced a white precipitate and the polarization characteristics of the cell could hardly be taken out.

Example 5

Cell E was produced in the same manner as in Example 1, except that n-butyric acid ($CH_3(CH_2)_2COOH$) was used as an organic solvent of carboxylic acid in the first step.

In this Example 5, n-butyric acid was used as the carboxylic acid solvent. The dispersing state of the colloidal dispersion changed depending on the difference in the carbon chain of the solvent and when the dispersion of the solid polymer electrolyte was added to a carboxylic acid solvent in which the carbon chain bonding to a polar group had 7 or more carbon atoms, such as octanoic acid, the solid polymer electrolyte produced a white precipitate and the polarization characteristics of the cell could hardly be taken out.

As other organic solvents, alcohols and glycols such as isopropyl alcohol, ethylene glycol and decyl alcohol were used, but none of these solvents produced colloid and the effects of the present invention could not be obtained.

Furthermore, when the dispersion of the solid polymer electrolyte was added to organic solvents having no polar group such as hexane, toluene, dodecane, cyclohexane, benzene, naphtha and kerosene, the solid polymer electrolyte produced a white precipitate and dispersing state of the solid polymer electrolyte was poor and polarization characteristics of the cells could hardly be taken out.

Example 6

Cell F together with cells A, B and C were produced in the same manner as in Example 1, except that n-butyl acetate ($CH_3COOCH_2(CH_2)_2CH_3$) as an organic solvent having a dielectric constant of 5.01 used in Example 1, tetrahydrofuran ($C_4H_8O$) as an organic solvent having a dielectric constant of 7.58 used in Example 2, methyl amyl ketone ($CH_3CO(CH_2)_4CH_3$) as an organic solvent having a dielectric constant of 9.77 used in Example 3, and furthermore, propionic acid ($C_2H_5COOH$) as an organic solvent having a dielectric constant of 3.44 were used in the first step.

In the above Example, organic solvents having a dielectric constant of 3–10 were used. The dispersing state of the colloid changed depending on the difference in the carbon chains of the solvents and when the dispersion of the solid polymer electrolyte was added to organic solvents having a dielectric constant of more than 10 such as n-octanol, ethylene glycol and glycerin having dielectric constants of 10.34, 37.7 and 42.5, respectively, no colloid was produced.

When the dispersion of the solid polymer electrolyte was added to organic solvents having a dielectric constant of less than 3 such as n-hexane, benzene, toluene, p-xylene and dodecane having dielectric constants of 1.89, 2.28, 2.38, 2.27 and 2.02, respectively, the solid polymer electrolyte produced a white precipitate and the polarization characteristics of the cells could hardly be taken out.

The dielectric constant changes depending on temperatures. Therefore, the values of the dielectric constant used in the present invention are represented in principle by those which are measured at 20°–25° C. as described in general handbooks.

Example 7

Cell A' was produced in the same manner as in Example 1, except that 25 g of carbon powder treated for water repellence by the addition of 25–70% by weight of PTFE was further added in preparation of the dispersion in the first step.

Example 8

Cell G was produced in the same manner as in Example 1, except that the alcoholic solution of the solid polymer electrolyte was added dropwise to the dispersion of the catalyst-supporting carbon powder in the organic solvent with stirring and these were mixed in the second step.

Example 9

Figure 7A:
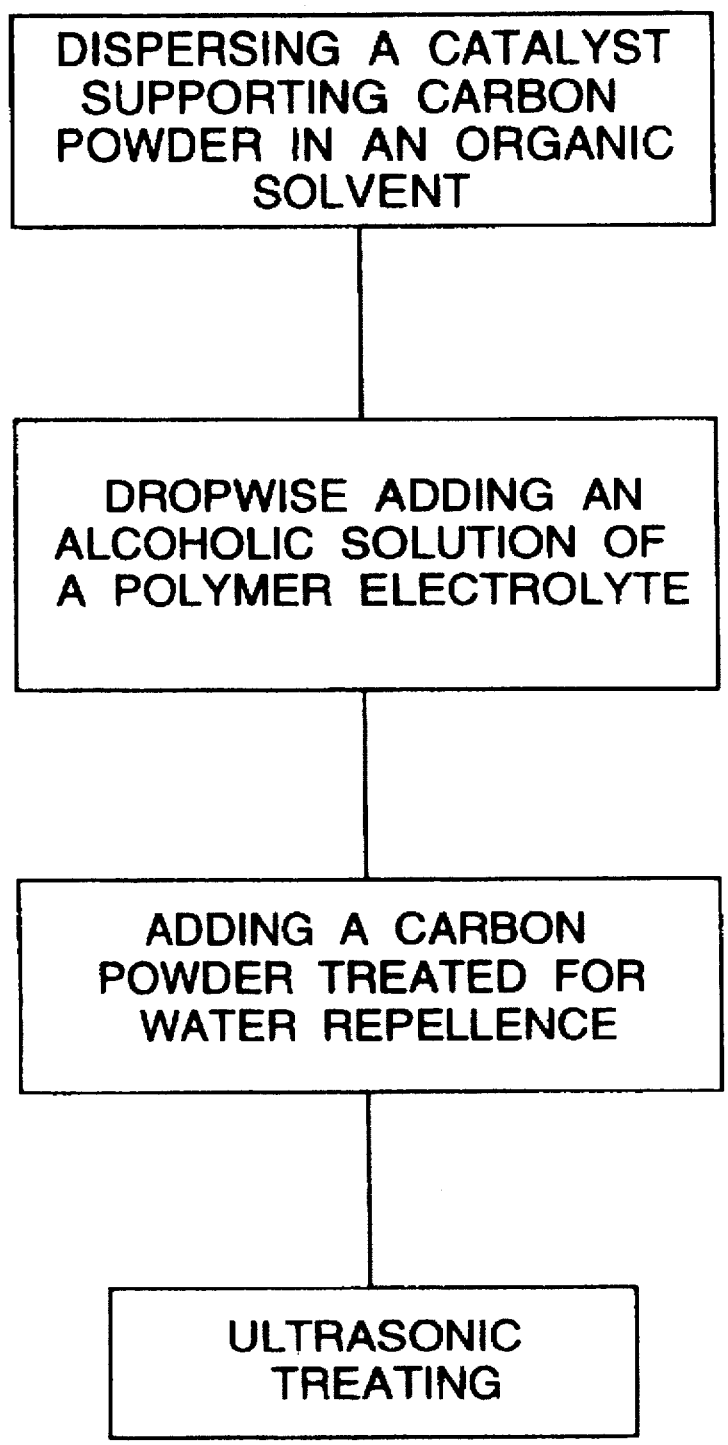
FIGS. 7a, 7b and 7c are block diagrams which show the steps of adding the carbon powder treated for water repellence in the example of the present invention.
Figure 7B:
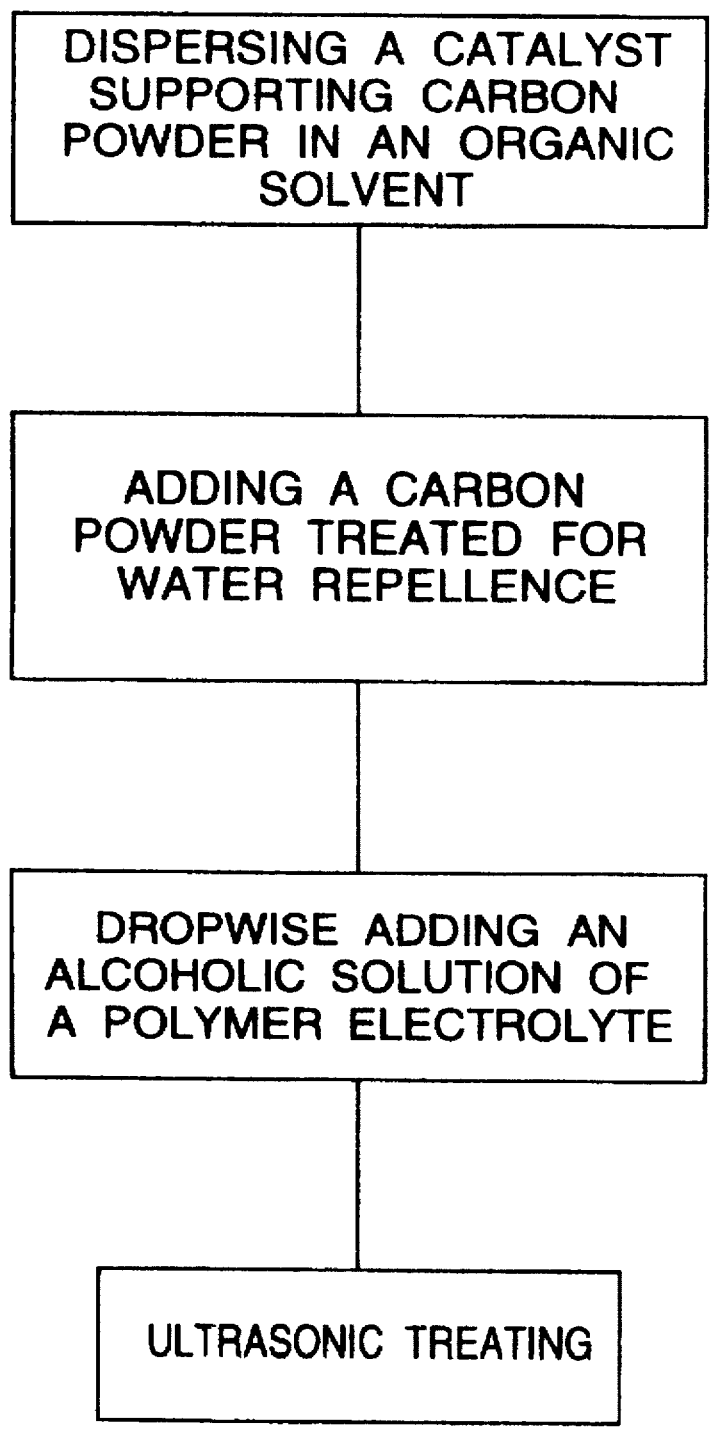
Figure 7C:
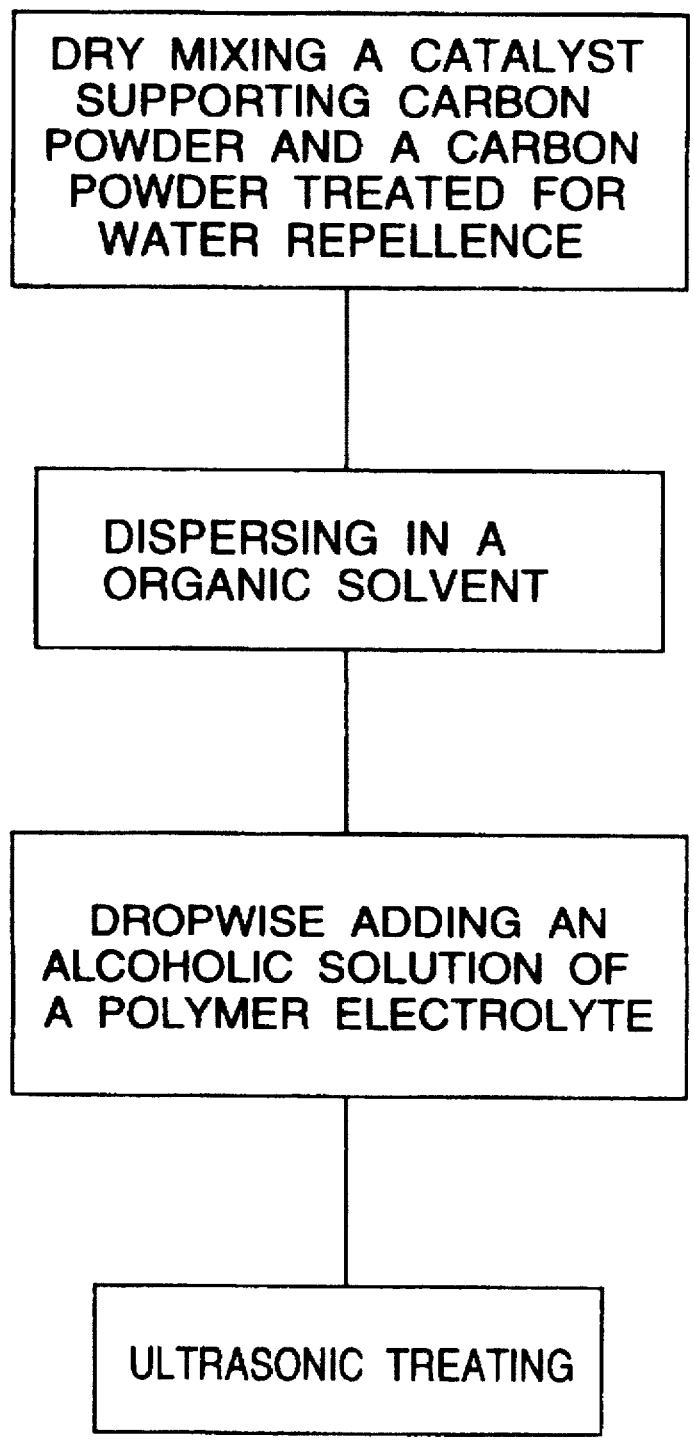

The same procedure as of Example 8 was repeated, except that 25 g of carbon powder treated for water repellence by the addition of 25–70% by weight of PTFE was further added in preparation of the dispersion in the first step. The carbon powder was added by the three methods shown in FIG. 7a–FIG. 7c. Thus, unit cells G'a, G'b and G'c were obtained, respectively.

Comparative Example 1

One example of production of solid polymer electrolyte fuel cells by conventional technique is shown below.

First, a carbon powder on which 10–25% by weight of a platinum catalyst was supported was mixed with a carbon powder treated for water repellence by the addition of 25–70% by weight of PTFE.

The resulting mixed powder for catalyst layer was sprinkled on a carbon paper to which 20–60% by weight of a fluorocarbon polymer was added and this carbon paper was hot pressed at 340°–380° C. under a pressure of 5–20 kg/cm$^2$ to make an electrode.

Addition of the solid polymer electrolyte to this electrode was carried out by coating a solution prepared by mixing 2 ml of isopropyl alcohol with 0.05–1.5 g of Nafion solution on the catalyst layer of the electrode with being sucked from the carbon paper side by a pump and drying the coat. The thus produced electrode was bonded to a solid polymer membrane in the same manner as in Example 1 to make cell X.

Figure 8:
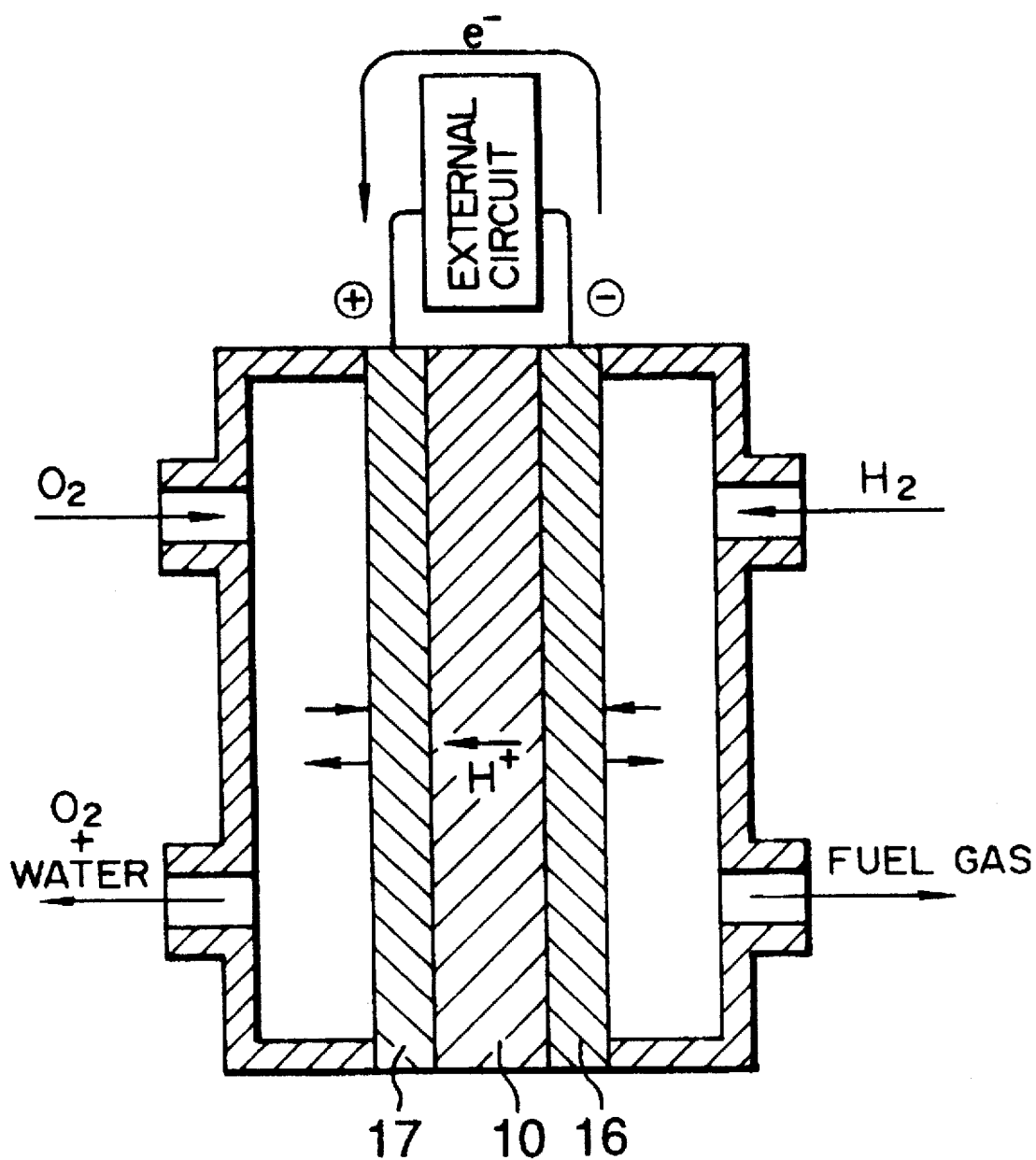
FIG. 8 is a schematic cross-sectional view of a unit cell of the solid polymer electrolyte fuel cell in the example of the present invention.

Fuel cells for measurement as shown in FIG. 8 were produced using cells A–G, A', G'a–G'c and X of the above Examples 1–9 and Comparative Example 1, and tests were conducted using the fuel cells.

In FIG. 8, 10 indicates a solid polymer electrolyte membrane. In the above Examples and Comparative Example, "Nafion 117 membrane" manufactured by DuPont de Nemours, E. I., Co. was used as the solid polymer electrolyte membrane 10. In FIG. 8, 16 and 17 show a negative electrode and a positive electrode, respectively. The amount of the solid polymer electrolyte added was 1.0 mg/cm$^2$ per apparent electrode area for both the electrodes, but the same characteristics were obtained with addition of the electrolyte in the range of 0.1–3.0 mg/cm$^2$. The amount of platinum was 0.5 mg/cm$^2$ similarly in terms of the weight per the electrode area. Discharge test was conducted by feeding a hydrogen gas humidified at 90° C. to the negative electrode side and an oxygen gas humidified at 80° C. to the positive electrode side from the inlet of the cell toward the outlet of the cell, respectively.

Figure 9:
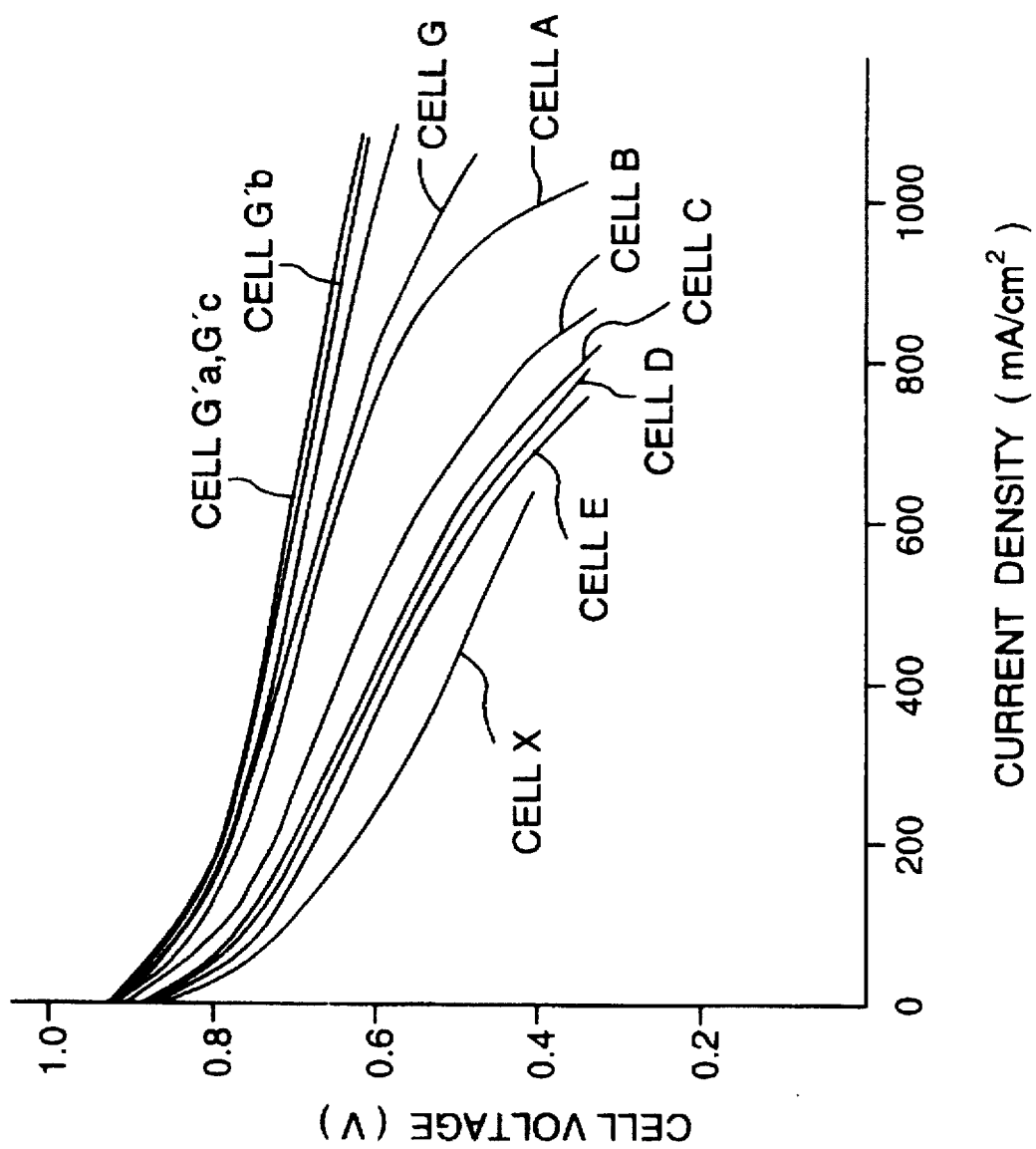
FIG. 9 is a graph which shows current density-voltage characteristics of the fuel cell.

FIG. 9 shows the current density-voltage characteristics of the cells of Examples 1–5 and 7–9 and Comparative Example. The cells A–G, A' and G'a–G'c of the present invention showed cell voltages of 0.77 V, 0.73 V, 0.70 V, 0.69 V, 0.68 V, 0.77 V, 0.78 V, 0.78 V, 0.78 V and 0.78 V at 200 mA/cm$^2$, respectively.

On the other hand, the cell X of the comparative example according to the conventional method showed a cell voltage of 0.62 V at 200 mA/cm$^2$.

From the results of the polarization test on the above cells, it can be seen that the cells of the present invention made using the organic solvents having effective carbon chains in the polar groups as of Examples 1–5 and 7 all show the higher performances than the conventional cell X.

Furthermore, the current densities of the cells A, A', G, G'a, G'b and G'c of the present examples at 850 mV after correction of resistance were 30 mA/cm$^2$, 29 mA/cm$^2$, 45 mA/cm$^2$, 45 mA/cm$^2$, 40 mA/cm$^2$ and 41 mA/cm$^2$, respectively. Since the current density at 850 mV after correction of resistance is an indication of the reaction area, it can be said that the cells G'a, G'b and G'c were larger in reaction area than the cells A and A'. It is considered that this is because fine colloid of the solid polymer electrolyte just after prepared was adsorbed to the catalyst-supporting carbon powder and the colloid was highly dispersed by adding dropwise the alcoholic solution of the solid polymer electrolyte to the dispersion of the catalyst-supporting carbon powder in the organic solvent with stirring. The reaction area in the cells G'b and G'c was smaller than in the cell G'a. It is considered that this is because in the cell G'a, the solid polymer electrolyte was adsorbed only to the catalyst-supporting carbon powder while in the cells G'b and G'c, the solid polymer electrolyte was also adsorbed to the carbon powder treated for water repellence.

Furthermore, the cell voltages of the cells A and A' at 1000 mA/cm$^2$ were 0.37 V and 0.58 V, respectively. On the other hand, the cell voltages of the cells G, G'a, G'b and G'c were high, namely, 0.5 V, 0.63 V, 0.62 V and 0.63 V, respectively. It is considered that this is because when the alcoholic solution of the solid polymer electrolyte was added dropwise, the solid polymer electrolyte covering the catalyst became thin, resulting in easy diffusion and permeation of the reaction gas.

Figure 10:
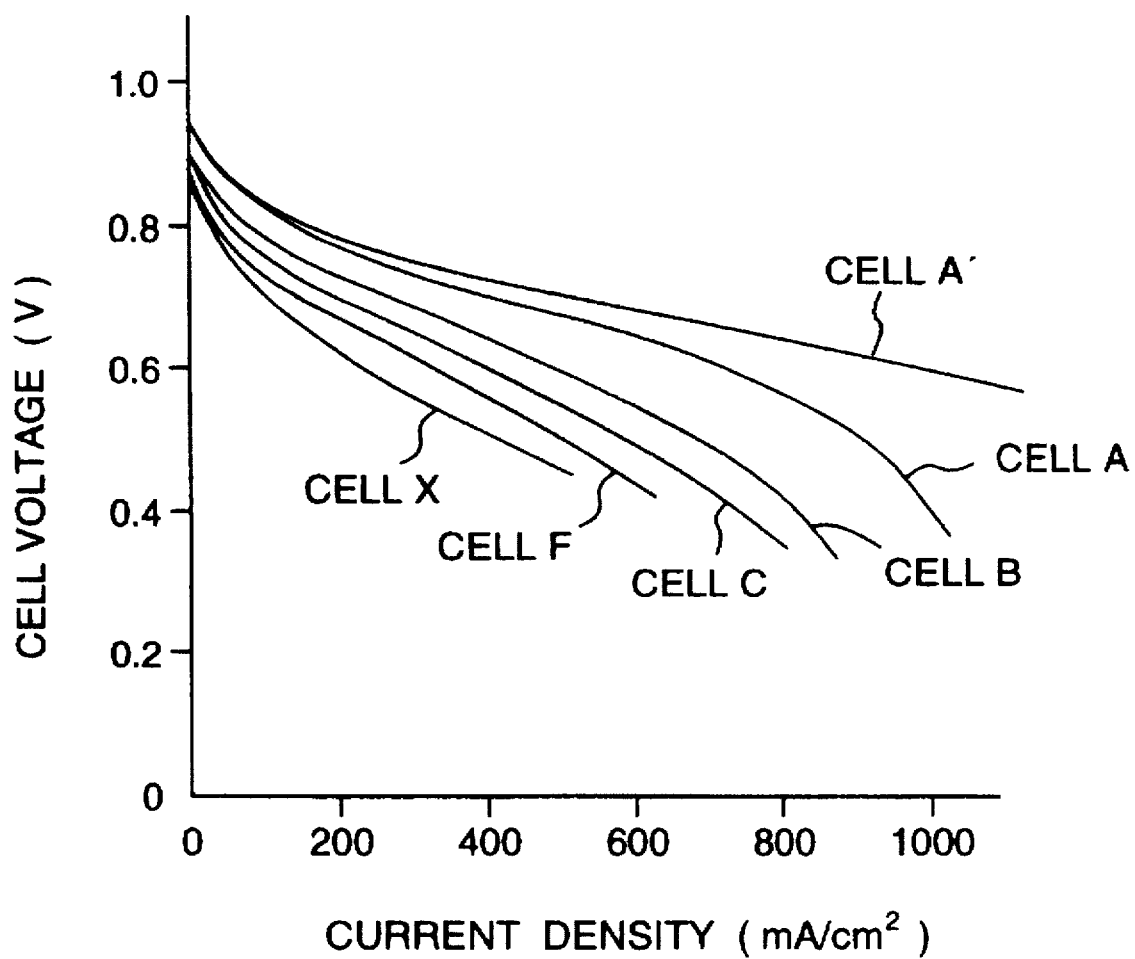
FIG. 10 is a graph which shows current density-voltage characteristics of the fuel cell.

FIG. 10 shows the current density-voltage characteristics of the cells of the representative examples where the organic solvents having a dielectric constant of 3–10 were used such as Examples 6 and 7 of the present invention and those of the cells of the comparative example. However, the cells other than cell F used the same organic solvent as of Examples 1–3 and 7 of the present invention and the test results were the same. The cells A, B, C, F and A' of the examples of the present invention showed cell voltages of 0.77 V, 0.73 V, 0.70 V, 0.67 V and 0.78 V, respectively, at 200 mA/cm$^2$.

On the other hand, the cell X of the comparative example according to the conventional method showed a cell voltage of 0.62 V at 200 mA/cm$^2$.

From the results of the polarization test, it can be seen that the cells of the present invention made using the organic solvents having a dielectric constant of 3–10 as in Examples 6 and 7 all showed the higher performances than the conventional cell X. Furthermore, it can be recognized that the organic solvents having a dielectric constant of 5–8 are especially high in the effect and butyl acetate is the most suitable from safety and economical viewpoints.

As explained above, by constructing a fuel cell using the electrode made by the method of the present invention, it has become possible to realize a solid polymer electrolyte fuel cell which shows the higher discharge performance.

Furthermore, as for the cell A', since a carbon powder treated for water repellence with a fluorocarbon polymer was added to the catalyst layer, the reaction gas feeding ability was improved and the cell voltage increased.

However, if the amount of the fluorocarbon polymer is less than 25% by weight of the carbon powder to be treated for water repellence, any satisfactory water repellence cannot be obtained and formation of the gas feeding channel is insufficient. If the amount of fluorocarbon polymer is more than 70% by weight of the carbon powder to be treated for water repellence, the fluorocarbon polymer covers the surface of the catalyst and the area of the catalyst contributing to the reaction decreases.

Figure 11:
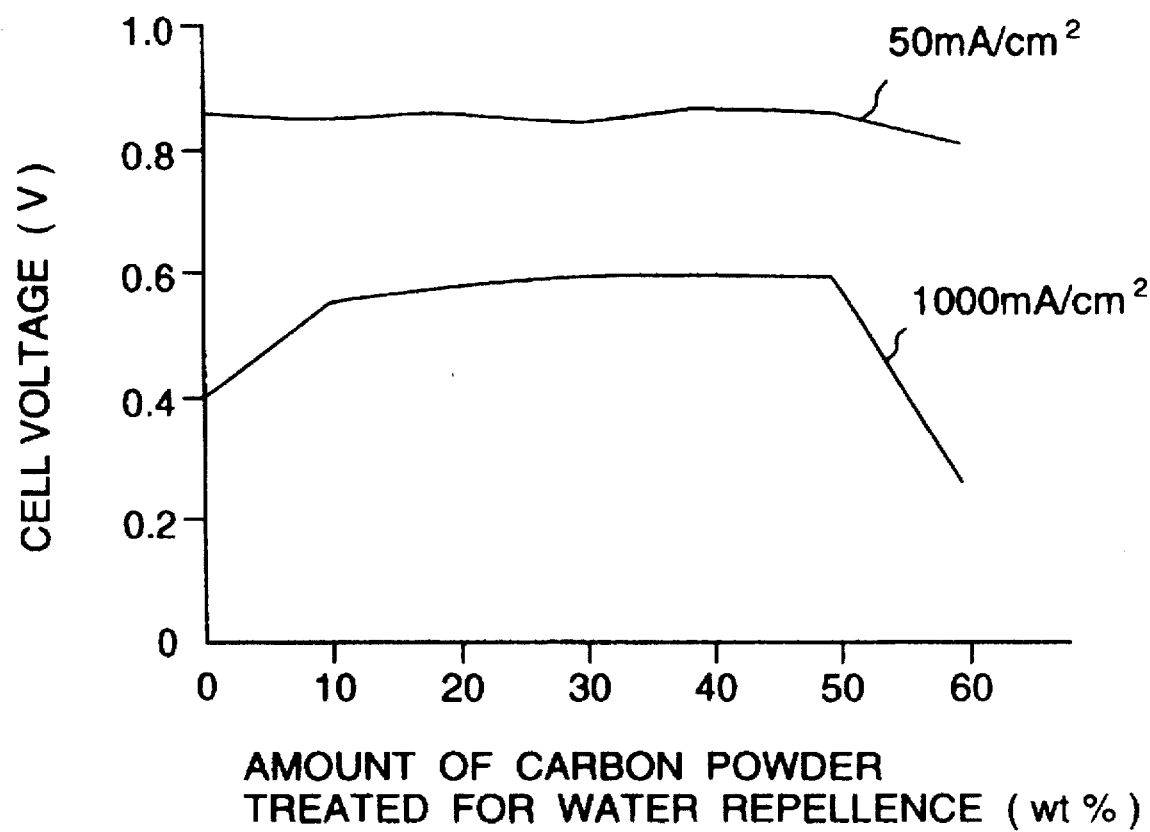
FIG. 11 is a graph which shows the relationship between the amount of the carbon powder treated for water repellence and the voltage of the cell.

FIG. 11 shows the relationship between the added amount of the carbon powder treated for water repellence with PTFE and the voltage of the cells of Examples 1 and 7 at 50 and 1000 mA/cm$^2$. The voltage at 50 mA/cm$^2$ which is an activation overpotential governing area somewhat decreased when the amount of the carbon powder treated for water repellence was 50% by weight or more, but the output was hardly affected. At 1000 mA/cm$^2$, the voltage increased with increase in the amount of the carbon powder treated for water repellence, but the cell voltage abruptly decreased when the amount reached 60% by weight.

TABLE 1

| Amount of carbon powder treated for water repellence (wt %) | 0 | 10 | 20 | 30 | 40 | 50 | 60 |
|---|---|---|---|---|---|---|---|
| Thickness of catalyst layer (μm) | 8 | 23 | 24 | 33 | 44 | 52 | 64 |

Table 1 shows thickness of the catalyst layer at the respective amounts of the carbon powder treated for water repellence. It can be seen that thickness of the catalyst layer increases with increase in the amount of the carbon powder treated for water repellence.

Since substantially no decrease in voltage in the low current density area is seen, it has become possible by the addition of carbon powder treated for water repellence to inhibit covering of the platinum catalyst with PTFE, namely, decrease of the reaction area. Furthermore, it can be said that the thickness of the electrode increases by the addition of the carbon powder treated for water repellence, but gas permeability of the electrode is improved by the formation of gas channel and the voltage in the high current density area of 1000 mA/cm$^2$ or higher increases. However, it is considered that when the amount of the water repelled carbon powder is 60% by weight or more, the effect obtained by the formation of gas channel is negated owing to the increase of the covering of platinum catalyst with PTFE and the increase of the electrode thickness and, as a result, the characteristics of the cell are deteriorated. Accordingly, the carbon powder treated for water repellence by the addition of a fluorocarbon polymer exhibits the effect when it is added in an amount of 10–50% by weight of carbon in the noble metal catalyst-supporting carbon powder.

Figure 12:
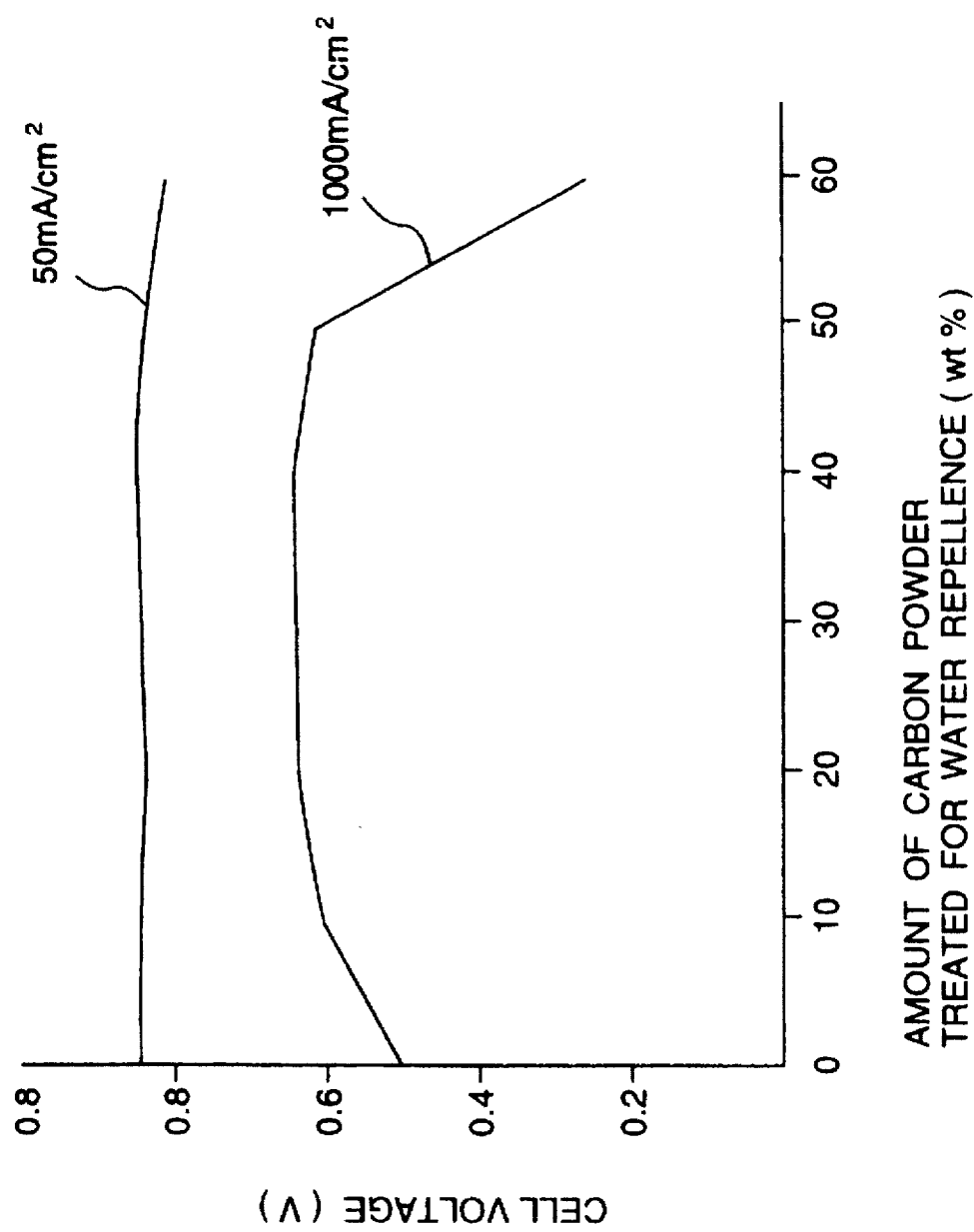
FIG. 12 is a graph which shows the relationship between the amount of the carbon powder treated for water repellence and the voltage of the cell.

FIG. 12 shows the relationship between the amount of the carbon powder treated for water repellence and the voltage of the cells G and G'a of Examples 8 and 9 at current densities of 50 and 1000 mA/cm$^2$.

As shown in FIG. 11, the voltage at 50 mA/cm$^2$ which is an activation overpotential governing area somewhat decreased when the amount of the carbon powder treated for water repellence was 50% by weight or more, but the output was hardly affected. At 1000 mA/cm$^2$, the voltage increased with increase in the amount of the carbon powder, but the cell voltage extremely decreased when the amount reached 60% by weight. From these results, it can be said that as in Examples 1 and 7, the gas channel was formed without covering the platinum catalyst by the addition of the carbon powder treated for water repellence and the gas permeability was improved. Furthermore, when the amount of the carbon powder was 60% by weight or more, the performances were deteriorated for the same reasons as in Examples 1 and 7. As for the cells G'b and G'c in this Example, the relation between voltage and the amount of the carbon powder treated for water repellence was similar to that of cell G'a.

Example 10

In the first step of the Embodiment 2, n-butyl acetate (CH$_3$COOCH$_2$(CH$_2$)$_2$CH$_3$) was used as the organic solvent having a dielectric constant of 5.01 and "5% Nafion solution" manufactured by Aldrich Chemical Co., Inc. was used as the solid polymer electrolyte. A white colloidal dispersion was produced by mixing 60 g of n-butyl acetate with 1 g of the Nafion polymer.

In the second step, when to the resulting colloidal dispersion was added 50 g of a carbon powder on which 10–25% by weight of a platinum catalyst was supported, the dispersed solid polymer electrolyte was adsorbed to the surface of the catalyst-supporting carbon powder and the supernatant liquid became transparent. When the carbon powders to which the solid polymer electrolyte was adsorbed were allowed to collide with each other by an ultrasonic dispersing machine, the adsorbed polymer was also adsorbed to other carbon powders to produce a bridging agglomeration and the dispersion became pasty.

In the third step, the resulting paste was applied on a carbon paper substrate to which 20–60% by weight of a fluorocarbon polymer was added (manufactured by Toray Industries, Inc.). The bridging agglomeration which occurred in the second step prevented the carbon powder-supporting catalyst from penetrating into the carbon paper and only the solvent was removed and filtrated, whereby it became possible to mold a catalyst layer on the surface of the substrate.

In the fourth step, the above electrodes were hot pressed onto both sides of a Nafion membrane manufactured by DuPont de Nemours, E., I., Co. by application of a pressure of 5–100 kg/cm$^2$ at 120°–200° C. to make a cell H.

Cells I–K were produced in the same manner as in producing the cell H, except that the materials shown in Table 2 were used as the organic solvent in place of butyl n-acetate (having a dielectric constant of 5.01) in the first step.

TABLE 2

| Organic solvents | Dielectric constant | Carbon powder treated for water repellence | |
|---|---|---|---|
| | | Added | Not added |
| n-Butylacetate | 5.01 | Cell H | Cell Y |
| Tetrahydrofuran | 7.58 | Cell I | Cell I' |
| Methyl amyl ketone | 9.77 | Cell J | Cell J' |
| n-Butyric acid | 3.44 | Cell K | Cell K' |

In this Example, n-butyl acetate was used as a typical example of organic solvents having a dielectric constant of 3–10. The dispersing state of the colloidal dispersion changed depending on the difference in the carbon chain of the solvent, and when the dispersion of the solid polymer electrolyte was added to organic solvents having a dielectric constant of more than 10, such as n-octanol, ethylene glycol and glycerin having dielectric constants of 10.34, 37.7 and 42.5, respectively, no colloidal dispersions were produced.

When the dispersion of the solid polymer electrolyte was added to organic solvents having a dielectric constant of less than 3, such as n-hexane, benzene, toluene, p-xylene and dodecane having dielectric constants of 1.89, 2.28, 2.38, 2.27 and 2.02, respectively, the solid polymer electrolyte produced a white precipitate and the polarization characteristics of the cells could hardly be taken out.

The dielectric constant changes depending on temperatures. Therefore, the values of the dielectric constant used in the present invention are represented in principle by those which are measured at 20°–25° C. as described in general handbooks.

Example 11

Cells I–L were produced in the same manner as in production of the cell H, except that the materials shown in Table 3 were used as the organic solvent in place of butyl n-acetate ($CH_3COOCH_2(CH_2)_2CH_3$, esters) in the first step. The cells I, J and K were the same as those in Example 10.

TABLE 3

| | | Carbon powder treated for water repellence | |
|---|---|---|---|
| | | Added | Not added |
| Esters | n-Butyl acetate | Cell H | Cell Y |
| Ethers | Tetrahydrofuran | Cell I | Cell I' |
| Ketones | Methyl amyl ketone | Cell J | Cell J' |
| Amines | n-Butylamine | Cell L | Cell L' |
| Carboxylic acids | n-Butyric acid | Cell K | Cell K' |

In this Example, n-butyl acetate was used as the ester organic solvent. The dispersing state of the colloidal dispersion changed depending on the difference in the carbon chain of the solvent, and when the dispersion of the solid polymer electrolyte was added to an ester solvent in which the carbon chain bonding to a polar group had 8 or more carbon atoms, such as 2-ethylhexyl acrylate, the solid polymer electrolyte produced a white precipitate and uniformity in adsorption to the carbon powder in the second step was deteriorated. As a result, dispersion of the solid polymer electrolyte became inferior and the polarization characteristics of the cell could hardly be taken out.

Furthermore, tetrahydrofuran was used above as the ether organic solvent. The dispersing state of the colloidal dispersion changed depending on the difference in the carbon chain of the solvent and when the dispersion of the solid polymer electrolyte was added to an ether solvent in which the carbon chain bonding to a polar group had 2 or less carbon atoms, such as diethyl ether, the colloid was not produced.

Moreover, when the dispersion of the solid polymer electrolyte was added to an ether solvent in which the carbon chain bonding to a polar group had 6 or more carbon atoms, such as dihexyl ether, the solid polymer electrolyte produced a white precipitate and the polarization characteristics of the cell could hardly be taken out.

Methyl amyl ketone was used above as the ketone organic solvent. The dispersing state of the colloid changed depending on the difference in the carbon chain of the solvent and when the dispersion of the solid polymer electrolyte was added to a ketone solvent in which the carbon chain bonding to a polar group had 3 or less carbon atoms, such as methyl ethyl ketone or methyl propyl ketone, the colloidal dispersion was not produced.

When the dispersion of the solid polymer electrolyte was added to a ketone solvent in which the carbon chain bonding to a polar group had 9 or more carbon atoms, such as methyl-n-nonyl ketone, the solid polymer electrolyte produced a white precipitate and the polarization characteristics of the cell could hardly be taken out.

Moreover, n-butylamine was used above as the amine organic solvent. The dispersing state of the colloid changed depending on the difference in the carbon chain of the solvent and when the dispersion of the solid polymer electrolyte was added to an amine solvent in which the carbon chain bonding to a polar group had 6 or more carbon atoms, such as cyclohexylamine, the solid polymer electrolyte produced a white precipitate and the polarization characteristics of the cell could hardly be taken out.

Furthermore, n-butyric acid was used above as the carboxylic acid organic solvent. The dispersing state of the colloidal dispersion changed depending on difference in the carbon chains of the solvent and when the dispersion of the solid polymer electrolyte was added to a carboxylic acid solvent in which the carbon chain bonding to a polar group had 7 or more carbon atoms, such as octanoic acid, the solid polymer electrolyte produced a white precipitate and the polarization characteristics of the cell could hardly be taken out.

As other organic solvents, alcohols and glycols such as isopropyl alcohol, ethylene glycol and decyl alcohol were used, but none of these solvents produced colloid and the effects of the present invention could not be obtained.

Furthermore, when the dispersion of the solid polymer electrolyte was added to organic solvents having no polar group such as hexane, toluene, dodecane, cyclohexane, benzene, naphtha and kerosene, the solid polymer electrolyte produced a white precipitate and dispersion of the solid polymer electrolyte was poor and polarization characteristics of the cells could hardly be taken out.

Comparative Example 2

In order to know the effect of the carbon powder treated for water repellence, cell Y was produced by bonding to a solid polymer membrane in the same manner as in Example 10, except that the carbon powder was not added. Furthermore, cells I', J', K' and L' were produced in the same manner as in the production of the cell Y, except that the materials shown in Tables 2 and 3 were used.

Comparative Example 3

One example of production of solid polymer electrolyte fuel cells by conventional technique is shown below.

First, a carbon powder on which 10–25% by weight of a platinum catalyst was supported was mixed with a carbon powder treated for water repellence by adding 25–70% by weight of PTFE.

The resulting mixed powder for catalyst layer was sprinkled on a carbon paper to which 20–60% by weight of a fluorocarbon polymer was added and this carbon paper was hot pressed at 340°–380° C. under a pressure of 5–20 kg/cm$^2$ to make an electrode.

Addition of the solid polymer electrolyte to this electrode was carried out by coating a solution prepared by mixing 2 ml of isopropyl alcohol with 0.05–1.5 g of a Nafion solution on the catalyst layer of the electrode with being sucked from the carbon paper side by a pump and drying the coat. The thus produced electrode was bonded to a solid polymer membrane in the same manner as in Example 10 to make a cell X.

Fuel cells for measurement as shown in FIG. 8 were produced using cells H–L, H'–L', X and Y of the above Examples and Comparative Examples.

In FIG. 8, 10 indicates a solid polymer electrolyte membrane. In the above Examples and Comparative Examples, "Nafion 117 membrane" manufactured by DuPont de Nemours. E. L. Co. was used as the solid polymer electrolyte membrane 10. In FIG. 8, 16 and 17 show a negative electrode and a positive electrode, respectively. The amount of the solid polymer electrolyte added was 1.0 mg/cm$^2$ per apparent electrode area for both the electrodes. The same performances were obtained with addition of the electrolyte in the range of 0.1–3.0 mg/cm$^2$. The amount of platinum was 0.5 mg/cm$^2$ similarly in terms of the weight per the electrode area. Discharge test was conducted by feeding a hydrogen gas humidified at 60° C. to the negative electrode side and an oxygen gas humidified at 60° C. to the positive electrode side from the inlet of the cell toward the outlet of the cell, respectively.

Figure 13:
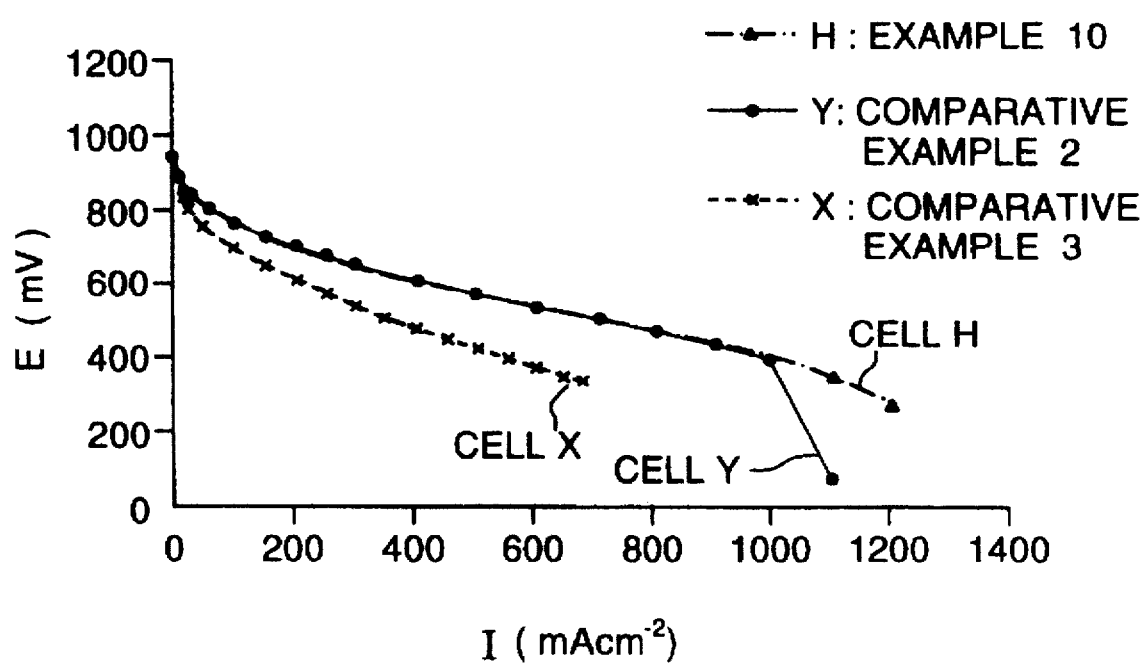
FIG. 13 is a graph which shows current density-voltage characteristics of the fuel cell.

FIG. 13 shows the current density-voltage characteristics of the cells H, X and Y of Example 10 and Comparative Examples. The cell H of the present invention showed a cell voltage of 0.37 V at 1100 mA/cm$^2$. On the other hand, the cell Y of Comparative Example 2 where the carbon powder treated for water repellence was not added showed a cell voltage of 0.09 V at 1100 mA/cm$^2$. As for the cell X of Comparative Example 3, discharging could not be performed at 1100 mA/cm$^2$.

Table 4 shows the cell voltages of cells I, J, K and N of Examples 10 and 11 of the present invention and cells I', J', K' and N' of Comparative Example 2 at 50 mA/cm$^2$ and 900 mA/cm$^2$. No difference due to the addition of the carbon powder treated for water repellence was seen at 50 mA/cm$^2$, but the cells produced with the addition of the carbon powder showed higher cell voltage at 900 mA/cm$^2$. The cell X of Comparative Example 3 could not be discharged also at 900 mA/cm$^2$.

TABLE 4

|        | Cell voltage at 50 mA/cm$^2$ | Cell voltage at 900 mA/cm$^2$ |
|--------|------------------------------|-------------------------------|
| Cell H |                              |                               |
| Cell I | 0.80 V                       | 0.35 V                        |
| Cell J | 0.78 V                       | 0.32 V                        |
| Cell L | 0.74 V                       | 0.28 V                        |
| Cell K | 0.77 V                       | 0.30 V                        |
| Cell Y |                              |                               |
| Cell I'| 0.80 V                       | 0.22 V                        |
| Cell J'| 0.785 V                      | 0.15 V                        |
| Cell L'| 0.75 V                       | 0.08 V                        |
| Cell K'| 0.78 V                       | 0.10 V                        |

From the results of the polarization test on the above cells, it can be seen that the cells of Examples 10 and 11 of the present invention all showed the higher performances than the conventional cells.

As explained above, by constructing a fuel cell using the electrode made by the method of the present invention, it has become possible to realize a solid polymer electrolyte fuel cell which shows the higher discharge performance. This is considered to be due to the two effects that the solid polymer electrolyte is more uniformly adsorbed to the surface of catalyst to increase the effective reaction area and the proton feeding ability to the catalyst is improved. It is considered that owing to these two effects the activation overpotential and the concentration overpotential for feeding of proton decrease to improve the performances.

Furthermore, from the result that the voltage of the cells of the examples of the present invention was improved in the high current-density area as compared with the cell of Comparative Example 2 where the carbon powder treated for water repellence was not added, it is considered that in the cells of the examples of the present invention, the reaction gas feeding channel was formed in the catalyst layer as shown in FIG. 2 by the addition of the carbon powder treated for water repellence and, as a result, gas feeding ability is improved, the concentration overpotential of the reaction gas decreased and cell voltage decreased.

If the amount of the fluorocarbon polymer is less than 25% by weight of the carbon powder to be treated for water repellence, any satisfactory water repellence cannot be obtained and formation of the gas feeding channel is insufficient. If the amount of the fluorocarbon polymer is more than 70% by weight of the carbon powder to be treated for water repellence, the fluorocarbon polymer covers the surface of the catalyst and the area of the catalyst contributing to the reaction decreases.

Figure 14:
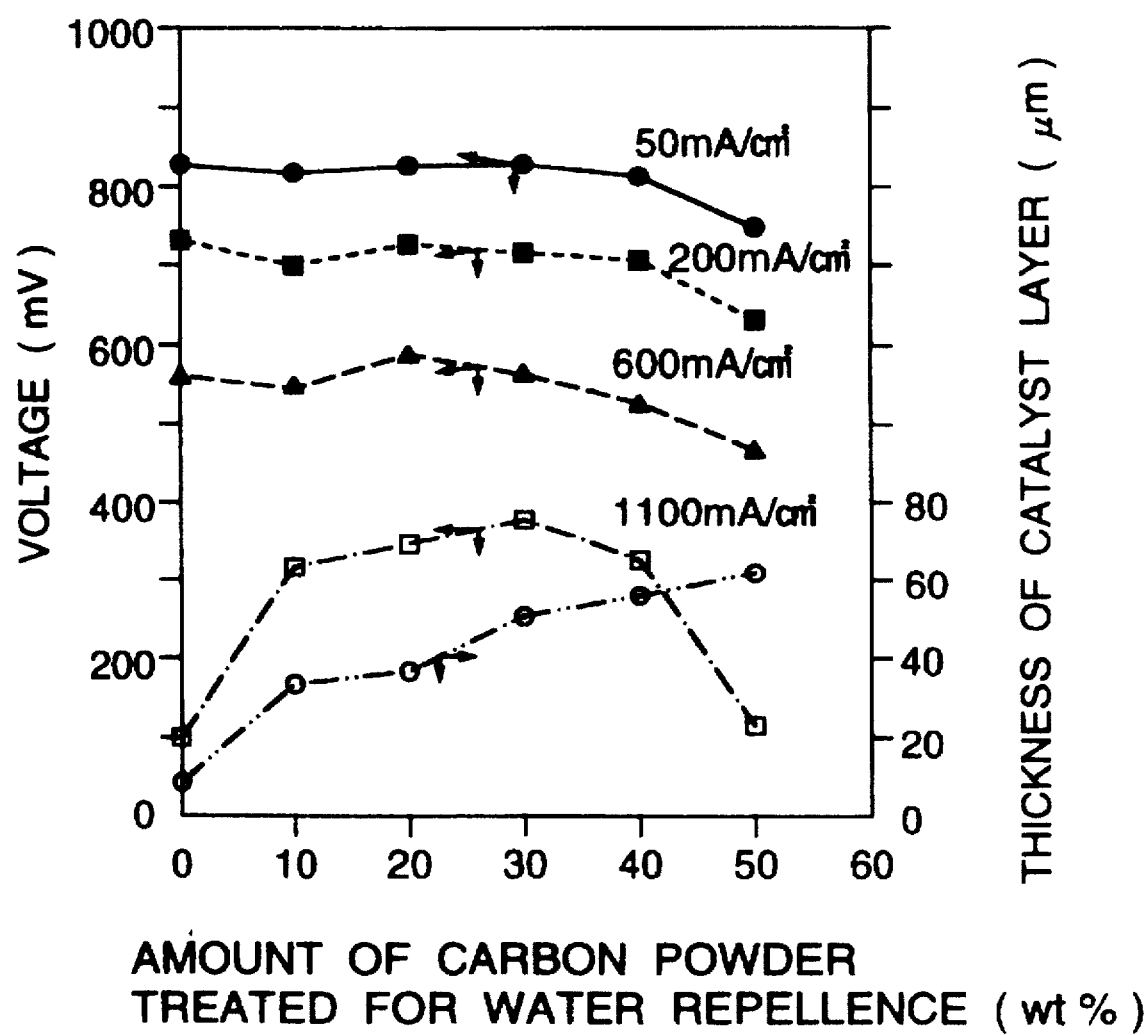
FIG. 14 is a graph which shows the change of the voltage of the cell and the thickness of the catalyst layer with the change in the amount of the carbon powder treated for water repellence in the example of the present invention.

FIG. 14 shows the relation between the amount of the carbon powder treated for water repellence and the voltage of cell H of Example 10 of the present invention at the various current densities.

The voltage at 50 mA/cm$^2$ which is in the activation overpotential governing area did not change before the amount reached 50% and decreased at 50%. Therefore, it is considered that when the amount was less than 50%, the catalyst was not covered with the carbon powder treated for water repellence.

The optimum range of the carbon powder treated for water repellence is seen in the high current density area, and at 1100 mA/cm$^2$ the effect was seen in the range of 10% or more and less than 50% as compared with the case when no carbon powder treated for water repellence was added.

In FIG. 14, the influence of the carbon powder treated for water repellence on thickness of the catalyst layer is also shown. It can be seen that thickness of the catalyst layer increased with increase in the amount of the carbon powder treated for water repellence.

In the examples of the present invention, substantially no decrease of voltage in the low current density area was seen, and, therefore, covering of the platinum catalyst with PTFE, namely, considerable decrease of reaction area was not seen due to the addition of the carbon powder treated for water repellence. Furthermore, thickness of the electrode increased by the addition of the carbon powder treated for water repellence, but it can be said that the effect of the formation of gas feeding channel is considerably large since the voltage in the high current density area increased. However, if the amount of the carbon powder treated for water repellence is excessive, the effect of the formation of gas feeding channel is negated by the covering of the platinum catalyst with PTFE and by the increase in the thickness of the electrode and the performances are deteriorated. Therefore, the optimum amount of the carbon powder treated for water repellence with added fluorocarbon polymers is 10% by weight or more and less than 50% by weight of carbon in the carbon powder which supports a noble metal catalyst.

Furthermore, the organic solvents are added desirably in such an amount that the finer colloidal dispersion can be produced, and in the examples of the present invention, representative values of the amount are mentioned and they do not limit the effect of the invention.

As a typical example of the organic solvents of ester, n-butyl acetate was used, but any of those which have an ester group in the molecule and have a carbon chain of 1–7 carbon atoms may be used and the similar effects can be obtained by using one or more of propyl formate, butyl formate, isobutyl formate, ethyl acetate, propyl acetate, isopropyl acetate, allyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl isobutyrate, methyl methacrylate, propyl butyrate, isopropyl isobutyrate, 2-ethoxyethylethyl acetate, 2-(2-ethoxyethoxy)ethyl acetate, etc.

As a typical example of the organic solvents of ethers, tetrahydrofuran was used, but any of those which have an ether group in the molecule and have a carbon chain of 3–5 carbon atoms may be used and the similar effects can also be obtained by using one or more of dipropyl ether, dibutyl ether, ethylene glycol dimethyl ether, ethylene glycol diethyl ether, tripropylene glycol monomethyl ether, tetrahydropyran, etc.

As a typical example of the organic solvents of ketones, methyl amyl ketone was used, but any of those which have a ketone group in the molecule and have a carbon chain of 4–8 carbon atoms may be used and the similar effects can also be obtained by using one or more of methyl butyl ketone, methyl isobutyl ketone, methyl hexyl ketone, dipropyl ketone, etc.

As a typical example of the organic solvents of amines, n-butylamine was used, but any of those which have an amino group in the molecule and have a carbon chain of 1–5 carbon atoms may be used and the similar effects can also be obtained by using one or more of isopropylamine, isobutylamine, tert-butylamine, isopentylamine, diethylamine, etc.

As a typical example of the organic solvents of carboxylic acids, n-butyric acid was used, but any of those which have a carboxyl group in the molecule and have a carbon chain of 1–6 carbon atoms may be used and the similar effects can also be obtained by using one or more of acetic acid, propionic acid, valeric acid, caproic acid, heptanoic acid, etc.

The organic solvents are added desirably in such an amount as capable of producing the finer colloidal dispersion, but the amounts employed in the above Examples are merely the representative values and never limit the effect of te present invention.

In the cells of the Examples, PTFE was used as the water repellant, but the same effect can be obtained using any resins having water repellence and acid resistance and, thus, PTFE is not limitative. For example, there may also be used tetrafluoroethylene/hexafluoropropylene copolymer, tetrafluoroethylene/perfluoroalkylvinyl ether copolymer, tetrafluoroethylene/ethylene copolymer, etc.

Furthermore, in the above Examples, "5% Nafion solution" manufactured by Aldrich Chemical Co., Inc. was used as a typical example of the polymers comprising copolymers of tetrafluoroethylene and perfluorovinyl ether as the solid polymer electrolyte, but the solid polymer electrolyte is not limited to that of the Examples as far as it has a proton exchanging group, and the similar effect can also be obtained using the polymers having a different molecular structure. For example, there may be used polymers comprising perfluorovinyl ethers, polymers differing in a side chain molecular length or copolymers of styrene and vinylbenzene.

Moreover, in the above Examples, a hydrogen-oxygen fuel cell was adopted, but it is possible to apply the present invention to fuel cells which use modified hydrogen obtained from methanol, natural gases, naphtha, etc. as fuels, those which use air as an oxidant, and liquid fuel cells which directly use methanol as a fuel. In addition, the solid polymer electrolyte and the electrode bonded to each other according to the present invention can be effectively applied to generators or purifiers of gases such as oxygen, ozone and hydrogen and various gas sensors such as oxygen sensors and alcohol sensors.

As explained above, according to the present invention, contact between the solid polymer electrolyte and the catalyst and dispersing state of them in the electrode can be improved and the three channels of the gas channel formed by the pores between the carbon powders which is a channel for feeding the fuel gas such as hydrogen or the oxidant gas such as oxygen, the proton channel formed by the hydrous solid polymer electrolyte and the electron channel formed by mutual connection of the carbon powders are formed very close to each other inside the same catalyst layer and the reaction area increases.

Accordingly, feeding of hydrogen gas and oxygen gas and transfer of proton and electron are carried out smoothly and over a wide range and thus it becomes possible to provide a solid polymer electrolyte fuel cell exhibiting the higher discharge performance.

Furthermore, a solid polymer electrolyte fuel cell excellent in discharge characteristics in a high current density area can be realized by forming the gas channel without excessive covering of catalyst particles by the addition of a carbon powder treated for water repellence with a fluorocarbon polymer.

What is claimed is:

1. A method for manufacturing a solid polymer electrolyte fuel cell which comprises the steps of:
   dispersing a carbon powder supporting a noble metal catalyst in an organic solvent to obtain a dispersion, mixing the resulting dispersion with an alcoholic solution of a solid polymer electrolyte to produce a colloid of the solid polymer electrolyte and simultaneously to obtain a mixed solution in which said colloid is adsorbed to the carbon powder, applying the mixed solution on one side of a gas-diffusion layer to produce an electrode, and pressing the resulting electrode onto at least one side of a solid polymer electrolyte membrane to integrate them.

2. A method according to claim 1, wherein the organic solvent has a polar group other than hydroxyl group, the carbon number of carbon chain bonding to this polar group being 1–8.

3. A method according to claim 1, wherein the organic solvent comprises one or more solvents having an ester group in the molecule and having a carbon chain of 1–7 carbon atoms.

4. A method according to claim 1, wherein the organic solvent comprises one or more solvents having an ether group in the molecule and having a carbon chain of 3–5 carbon atoms.

5. A method according to claim 1, wherein the organic solvent comprises one or more solvents having a carbonyl group in the molecule and having a carbon chain of 4–8 carbon atoms.

6. A method according to claim 1, wherein the organic solvent comprises one or more solvents having an amino group in the molecule and having a carbon chain of 1–5 carbon atoms.

7. A method according to claim 1, wherein the organic solvent comprises one or more solvents having a carboxyl group in the molecule and having a carbon chain of 1–6 carbon atoms.

8. A method according to claim 1, wherein the organic solvent comprises one or more solvents having a dielectric constant of 3–10.

9. A method according to claim 1, wherein the alcoholic solution of solid polymer electrolyte is added dropwise to the dispersion under stirring.

10. A method according to claim 1, which additionally comprises a step of adding a carbon powder treated for water repellence with a fluorocarbon polymer.

11. A method according to claim 10, wherein the carbon powder treated for water repellence is added in an amount of 10–50% by weight of the carbon powder supporting a noble metal catalyst and contains the fluorocarbon polymer for the water repelling treatment in an amount of 25–70% by weight based on the total amount.

12. A method according to claim 2, wherein the organic solvent comprises one or more solvents having an ester group in the molecule and having a carbon chain of 1–7 carbon atoms.

13. A method according to claim 2, wherein the organic solvent comprises one or more solvents having an ether group in the molecule and having a carbon chain of 3–5 carbon atoms.

14. A method according to claim 2, wherein the organic solvent comprises one or more solvents having a carbonyl group in the molecule and having a carbon chain of 4–8 carbon atoms.

15. A method according to claim 2, wherein the organic solvent comprises one or more solvents having an amino group in the molecule and having a carbon chain of 1–5 carbon atoms.

16. A method according to claim 2 wherein the organic solvent comprises one or more solvents having a carboxyl group in the molecule and having a carbon chain of 1–6 carbon atoms.

17. A method according to claim 2, wherein the alcoholic solution of solid polymer electrolyte is added dropwise to the dispersion under stirring.

18. A method according to claim 8, wherein the alcoholic solution of solid polymer electrolyte is added dropwise to the dispersion under stirring.

19. A method according to claim 2, which additionally comprises a step of adding a carbon powder treated for water repellence with a fluorocarbon polymer.

20. A method according to claim 8, which additionally comprises a step of adding a carbon powder treated for water repellence with a fluorocarbon polymer.

21. A method according to claim 19, wherein the carbon powder treated for water repellence is added in an amount of 10–50% by weight of the carbon powder supporting a noble metal catalyst and contains the fluorocarbon polymer for the water repelling treatment in an amount of 25–70% by weight based on the total amount.

22. A method according to claim 20, wherein the carbon powder treated for water repellence is added in an amount of 10–50% by weight of the carbon powder supporting a noble metal catalyst and contains the fluorocarbon polymer for the water repelling treatment in an amount of 25–70% by weight based on the total amount.

23. A method for manufacturing a solid polymer electrolyte fuel cell which comprises the step of:

mixing an organic solvent with an alcoholic solution of a solid polymer electrolyte to obtain a colloidal dispersion in which a colloid of the solid polymer electrolyte is produced and dispersed, adding a carbon powder supporting a noble metal catalyst to the resulting colloidal dispersion to obtain a mixed solution in which the colloid of the solid polymer electrolyte is adsorbed to the surface of the carbon powder, adding a carbon powder treated for water repellence with a fluorocarbon polymer to the mixed solution, applying the mixed solution on one side of a gas-diffusion layer to produce an electrode, and pressing the resulting electrode onto at least one side of a solid polymer electrolyte membrane to integrate them.

24. A method according to claim 23, wherein the organic solvent has a polar group other than hydroxyl group, the carbon number of carbon chain bonding to this polar group being 1–8.

25. A method according to claim 23, wherein the organic solvent comprises one or more solvents having an ester group in the molecule and having a carbon chain of 1–7 carbon atoms.

26. A method according to claim 23, wherein the organic solvent comprises one or more solvents having an ether group in the molecule and having a carbon chain of 3–5 carbon atoms.

27. A method according to claim 23, wherein the organic solvent comprises one or more solvents having a carbonyl group in the molecule and having a carbon chain of 4–8 carbon atoms.

28. A method according to claim 23, wherein the organic solvent comprises one or more solvents having an amino group in the molecule and having a carbon chain of 1–5 carbon atoms.

29. A method according to claim 23, wherein the organic solvent comprises one or more solvents having a carboxyl group in the molecule and having a carbon chain of 1–6 carbon atoms.

30. A method according to claim 23, wherein the organic solvent comprises one or more solvents having a dielectric constant of 3–10.

31. A method according to claim 23, wherein the carbon powder treated for water repellence is added in an amount of 10–50% by weight of the carbon powder supporting a noble metal catalyst and contains the fluorocarbon polymer in an amount of 25–70% by weight based on the total amount.

32. A method according to claim 24, wherein the organic solvent comprises one or more solvents having an ester group in the molecule and having a carbon chain of 1–7 carbon atoms.

33. A method according to claim 24, wherein the organic solvent comprises one or more solvents having an ether group in the molecule and having a carbon chain of 3–5 carbon atoms.

34. A method according to claim 24, wherein the organic solvent comprises one or more solvents having a carbonyl group in the molecule and having a carbon chain of 4–8 carbon atoms.

35. A method according to claim 24, wherein the organic solvent comprises one or more solvents having an amino group in the molecule and having a carbon chain of 1–5 carbon atoms.

36. A method according to claim 24, wherein the organic solvent comprises one or more solvents having a carboxyl group in the molecule and having a carbon chain of 1–6 carbon atoms.

37. A method according to claim 23, wherein at least a plurality of particles of the powder treated for water repellence is maintained as a continuous group, so that a continuous gas channel is formed.

* * * * *